(12) United States Patent
Cooper et al.

(10) Patent No.: US 11,131,374 B2
(45) Date of Patent: Sep. 28, 2021

(54) DRIVE UNIT ASSEMBLY WITH POWER BOOST AND TORQUE VECTORING

(71) Applicant: DANA AUTOMOTIVE SYSTEMS GROUP, LLC, Maumee, OH (US)

(72) Inventors: Kenneth E. Cooper, Las Vegas, NV (US); Frederik Desmet, Roeselare (BE); Thibault G. Devreese, Ghent (BE)

(73) Assignee: Dana Automotive Systems Group, LLC, Maumee, OH (US)

( * ) Notice: Subject to any disclaimer, the term of this patent is extended or adjusted under 35 U.S.C. 154(b) by 210 days.

(21) Appl. No.: 16/464,316

(22) PCT Filed: Sep. 25, 2017

(86) PCT No.: PCT/US2017/053195
§ 371 (c)(1),
(2) Date: May 28, 2019

(87) PCT Pub. No.: WO2018/102012
PCT Pub. Date: Jun. 7, 2018

(65) Prior Publication Data
US 2021/0107345 A1   Apr. 15, 2021

Related U.S. Application Data

(60) Provisional application No. 62/428,051, filed on Nov. 30, 2016.

(51) Int. Cl.
| | |
|---|---|
| *F16H 48/10* | (2012.01) |
| *H02K 7/116* | (2006.01) |
| *B60K 17/02* | (2006.01) |
| *B60K 17/16* | (2006.01) |
| *B60K 23/08* | (2006.01) |
| *B60K 23/04* | (2006.01) |

(Continued)

(52) U.S. Cl.
CPC ............. *F16H 48/10* (2013.01); *H02K 7/116* (2013.01); *B60K 17/02* (2013.01); *B60K 17/16* (2013.01);
(Continued)

(58) Field of Classification Search
None
See application file for complete search history.

(56) References Cited

U.S. PATENT DOCUMENTS

| | | | |
|---|---|---|---|
| 6,880,664 B2 | 4/2005 | Pecnik et al. | |
| 6,896,635 B2 * | 5/2005 | Tumback | ................ F16H 3/728 475/5 |

(Continued)

FOREIGN PATENT DOCUMENTS

| | | |
|---|---|---|
| AT | 6377 U1 | 9/2003 |
| DE | 102005014913 A1 | 10/2006 |

(Continued)

OTHER PUBLICATIONS

European Patent Office, International Search Report with Written Opinion issued in PCT/US2017/053195, dated Feb. 20, 2018, 10 pages, European Patent Office, Rijswijk, Netherlands.

*Primary Examiner* — Dirk Wright
(74) *Attorney, Agent, or Firm* — McCoy Russell LLP

(57) ABSTRACT

A drive unit having motor output shaft that is connected to a sun gear is connected to one or more planetary gears that are connected to a planetary gear housing. The housing is connected to planetary gear assembly pinion gear, which is connected to a ring gear. A first side of the ring gear is connected to a first clutch drum and the second side of the ring gear is connected to a second clutch drum. Connected to the first clutch drum is a first plurality of clutch plates interleafed with a second plurality of clutch plates connected to a first clutch can. The first clutch can is connected to a first shaft. Connected to the second clutch drum is a third (Continued)

plurality of clutch plates interleafed with a fourth plurality of clutch plates connected to a second clutch can. The second clutch can is connected to a second shaft.

18 Claims, 10 Drawing Sheets

(51) Int. Cl.
  *F16H 48/22* (2006.01)
  *F16H 48/34* (2012.01)
(52) U.S. Cl.
  CPC .... *B60K 23/0808* (2013.01); *B60K 2023/043* (2013.01); *F16H 48/22* (2013.01); *F16H 2048/343* (2013.01)

(56) References Cited

U.S. PATENT DOCUMENTS

| | | | |
|---|---|---|---|
| 6,945,347 B2 | 9/2005 | Matsuno | |
| 7,056,252 B2 | 6/2006 | Gumpoltsberger et al. | |
| 7,186,199 B1 | 3/2007 | Baxter, Jr. | |
| 7,296,644 B2 * | 11/2007 | Teraoka | F16H 48/34 180/65.25 |
| 7,811,194 B2 | 10/2010 | Bowen | |
| 8,052,562 B2 * | 11/2011 | Greb | B60K 6/547 475/5 |
| 8,808,132 B2 | 8/2014 | Ross | |
| 9,102,233 B2 * | 8/2015 | Knoblauch | B60K 17/12 |
| 9,868,349 B2 * | 1/2018 | Pritchard | B60K 17/02 |
| 10,030,755 B2 | 7/2018 | Severinsson et al. | |
| 10,167,906 B2 * | 1/2019 | Neelakantan | F16D 25/061 |
| 10,316,946 B2 * | 6/2019 | Sten | B60K 1/02 |
| 10,391,852 B2 * | 8/2019 | Jorgensson | B60K 6/40 |
| 10,569,647 B2 * | 2/2020 | Yamamura | B60K 23/0808 |
| 2012/0029748 A1 | 2/2012 | Kozarekar et al. | |
| 2016/0138695 A1 | 5/2016 | Tronnberg | |

FOREIGN PATENT DOCUMENTS

| | | |
|---|---|---|
| EP | 1533166 A2 | 5/2005 |
| JP | H1199838 A | 4/1999 |

* cited by examiner

DRIVE UNIT ASSEMBLY WITH POWER BOOST AND TORQUE VECTORING

CROSS-REFERENCE TO RELATED APPLICATIONS

The present application claims the benefit to U.S. Provisional Patent Application No. 62/428,051 filed on Nov. 30, 2016, which is incorporated herein by reference in its entirety.

FIELD OF THE DISCLOSURE

A drive unit assembly with power boost and torque vectoring capabilities for use in a motor vehicle.

BACKGROUND OF THE DISCLOSURE

In recent years' considerable attention has been given to producing vehicles with increased fuel efficiency to reduce the overall fuel consumption of motorized vehicles all over the world. Additionally, in light of increasingly stringent emission controls considerable attention has been given to producing vehicles that produce fewer emissions. As a result, considerable attention is being given to producing hybrid vehicles and all electric vehicles that have a reduced fuel consumption and produce fewer emissions. Hybrid vehicles typically use two or more distinct power sources to provide the power necessary to drive the vehicle.

Many conventional hybrid vehicles incorporate the use of an internal combustion engine and an electric motor to provide the rotational power necessary to drive the vehicle. The electric motor of the hybrid vehicle alone or in combination with the internal combustion engine provides the rotational power necessary to drive the forward axle system of the vehicle. Additionally, the internal combustion engine of some conventional all-wheel drive (AWD) hybrid vehicles is used to provide the rotational power necessary to drive the forward axle system and the rear axle system of the vehicle. In order for the internal combustion engine to provide the rear axle system with the rotational power necessary to drive the vehicle, a secondary drive-line system is used. The secondary drive-line system extends from the internal combustion engine of the vehicle to the rear axle system. The secondary drive-line adds additional weight to the vehicle and takes up space under the vehicle. It would therefore be advantageous to develop a drive unit that would avoid the use of a secondary drive-line to drive the rear axle system of the vehicle.

Additionally, it would be advantageous to develop a hybrid drive unit that will provide the vehicle with a power boost, an electric drive mode, a battery charging mode, a disconnect mode, torque vectoring capabilities and regenerative breaking capabilities.

SUMMARY OF THE DISCLOSURE

A drive unit for use in a motor vehicle. The drive unit includes a motor having a motor output shaft that is drivingly connected to a sun gear of a planetary gear assembly. At least a portion of the sun gear is drivingly connected to at least a portion of one or more planetary gears that are drivingly connected to at least a portion of a planetary gear housing. The planetary gear housing of the planetary gear assembly is then connected to at least a portion of a first side planetary gear assembly pinion gear.

Drivingly connected to at least a portion of the planetary gear assembly pinion gear us a ring gear having a first side and a second side. At least a portion of a first clutch drum is connected to at least a portion of a first side of the ring gear. Connected to at least a portion of an inner surface of the first clutch drum is a first plurality of clutch plates that are connected to at least a portion of an outer surface of a first clutch can. An end of a first shaft is then drivingly connected to at least a portion of the first clutch can.

At least a portion of a second clutch drum is connected to at least a portion of a second side of the ring gear. Connected to at least a portion of an inner surface of the second clutch drum is a third plurality of clutch plates that are interleafed with a fourth plurality of clutch plates connected to at least a portion of an outer surface of a second clutch can. An end of a second shaft is then drivingly connected to at least a portion of an inner surface of said second clutch can.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

The present disclosure relates to a drive unit assembly for a motor vehicle. As a non-limiting example, the drive unit assemblies disclosed herein may be used as a rear axle drive unit, a forward axle drive unit, a primary drive unit, a secondary drive unit, a rear drive unit to drive and/or a drive unit to drive one or more of the wheels of the vehicle independently.

It is within the scope of this disclosure, and as a non-limiting example, that the drive unit assemblies disclosed herein may be used in automotive, off-road vehicle, all-terrain vehicle, construction, structural, marine, aerospace, locomotive, military, machinery, robotic and/or consumer product applications. Additionally, as a non-limiting example, the drive unit assemblies disclosed herein may also be used in passenger vehicle, electric vehicle, hybrid vehicle, commercial vehicle and/or heavy vehicle applications.

Figure 1:
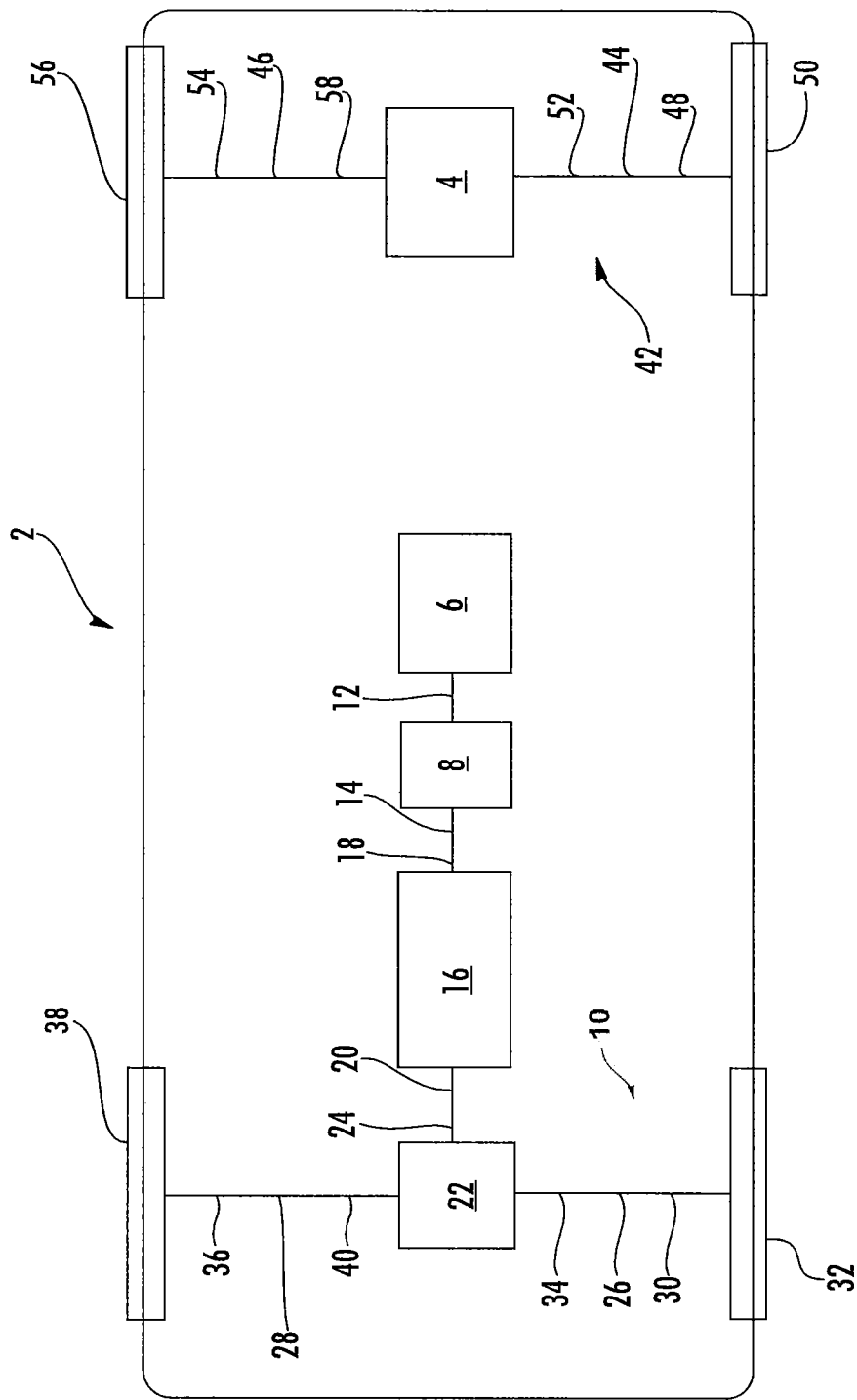
FIG. 1 is a schematic top-plan view of a vehicle having a drive unit assembly according to an embodiment of the disclosure.

FIG. 1 is a schematic top-plan view of a vehicle 2 having a drive unit assembly 4 according to an embodiment of the disclosure. It is within the scope of this disclosure that the vehicle 2 may be a hybrid vehicle having any type of drive-train configuration such as but not limited to a series hybrid drive-train configuration or a parallel hybrid drive-train configuration. As illustrated in FIG. 1, the vehicle 2 is a hybrid vehicle with a parallel hybrid drive-train configuration.

An engine 6 and an electric motor 8 are used to provide the rotational power necessary to drive a forward axle system 10 of the vehicle 2. As non-limiting example, the engine 6 of the vehicle 2 can be an internal combustion engine, a gas turbine and/or a steam turbine. The engine 6 of the vehicle 2 is drivingly connected to an end of an engine output shaft 12. Drivingly connected to at least a portion of an end of the engine output shaft 12 opposite the engine 6 is the electric motor 8. An electric motor output shaft 14 is drivingly connected to an end of the electric motor 8 opposite the engine output shaft 12. Drivingly connecting the engine 6 and the electric motor 8 to a transmission 16 is a transmission input shaft 18. The transmission 16 is a power management system, which provides controlled application of the rotational power generated by the engine 6 and/or the electric motor 8 by means of a gear box.

A transmission output shaft 20 is drivingly connected to an end of the transmission 16 opposite the transmission input shaft 18. The transmission output shaft 20 drivingly connects the transmission 16 to a differential 22 of the forward axle system 10 via a forward axle differential input shaft 24. The forward axle differential 22 is a set of gears that allows the outer drive wheel(s) of the wheeled vehicle 2 to rotate at a faster rate that the inner drive wheel(s). The rotational power is transmitted through the forward axle system 10 as described in more detail below.

The forward axle system 10 further includes a first forward axle half shaft 26 and a second forward axle half shaft 28. The first forward axle half shaft 26 extends substantially perpendicular to the forward axle differential input shaft 24. A first end 30 of the first forward axle half shaft 26 is drivingly connected to a first forward axle wheel assembly 32 and a second end 34 of the first forward axle half shaft 26 is drivingly connected to an end of the forward axle differential 22. In a non-limiting example, the second end 34 of the first forward axle half shaft 26 is drivingly connected to a differential side gear, a separate stub shaft, a separate coupling shaft, a forward axle differential output shaft and/or a shaft that is formed as part of a differential side gear.

The second forward axle half shaft 28 also extends substantially perpendicular to the forward axle differential input shaft 24. A first end 36 of the second forward axle half shaft 28 is drivingly connected to a second forward axle wheel assembly 38 and a second end 40 of the second forward axle half shaft 26 is drivingly connected to an end of the forward axle differential 22 opposite the first forward axle input shaft 26. In a non-limiting example, the second end 40 of the second forward axle half shaft 28 is drivingly connected to a differential side gear, a separate stub shaft, a separate coupling shaft, a forward axle differential output shaft and/or a shaft that is formed as part of a differential side gear.

According to the embodiment of the disclosure illustrated in FIG. 1, the drive unit assembly 4 of the vehicle 2 provides the rotational power necessary to drive a rear axle system 42. Additionally, according to an embodiment of the disclosure, the drive unit assembly 4 also provides torque vectoring capabilities thereby allowing the amount of rotational power and/or torque that is transferred to each wheel of the rear axle system 42 to be varied depending on the type driving conditions that the vehicle 2 is in. The rotational power is transmitted through the rear axle system 42 as described in more detail below.

As illustrated in FIG. 1, the rear axle system 42 further includes a first rear axle half shaft 44 and a second rear axle half shaft 46. A first end 48 of the first rear axle half shaft 44 is drivingly connected to a first rear axle wheel assembly 50 and a second end 52 of the first rear axle half shaft 44 is drivingly connected to an end of the drive unit assembly 4. In a non-limiting example, the second end 52 of the first rear axle half shaft 44 is drivingly connected to a rear axle differential side gear, a first drive unit output shaft, a separate stub shaft, a separate coupling shaft, a first rear axle differential output shaft and/or a shaft that is formed as part of a rear axle differential side gear.

A first end 54 of the second rear axle half shaft 46 is drivingly connected to a second rear axle wheel assembly 56 and a second end 58 of the second rear axle half shaft 46 is drivingly connected to an end of the drive unit assembly 4 opposite the first rear axle half shaft 44. In a non-limiting example, the second end 58 of the second rear axle half shaft 46 is drivingly connected to a rear axle differential side gear, a second drive unit output shaft, a separate stub shaft, a separate coupling shaft, a second rear axle differential output shaft and/or a shaft that is formed as part of a rear axle differential side gear.

Figure 2:
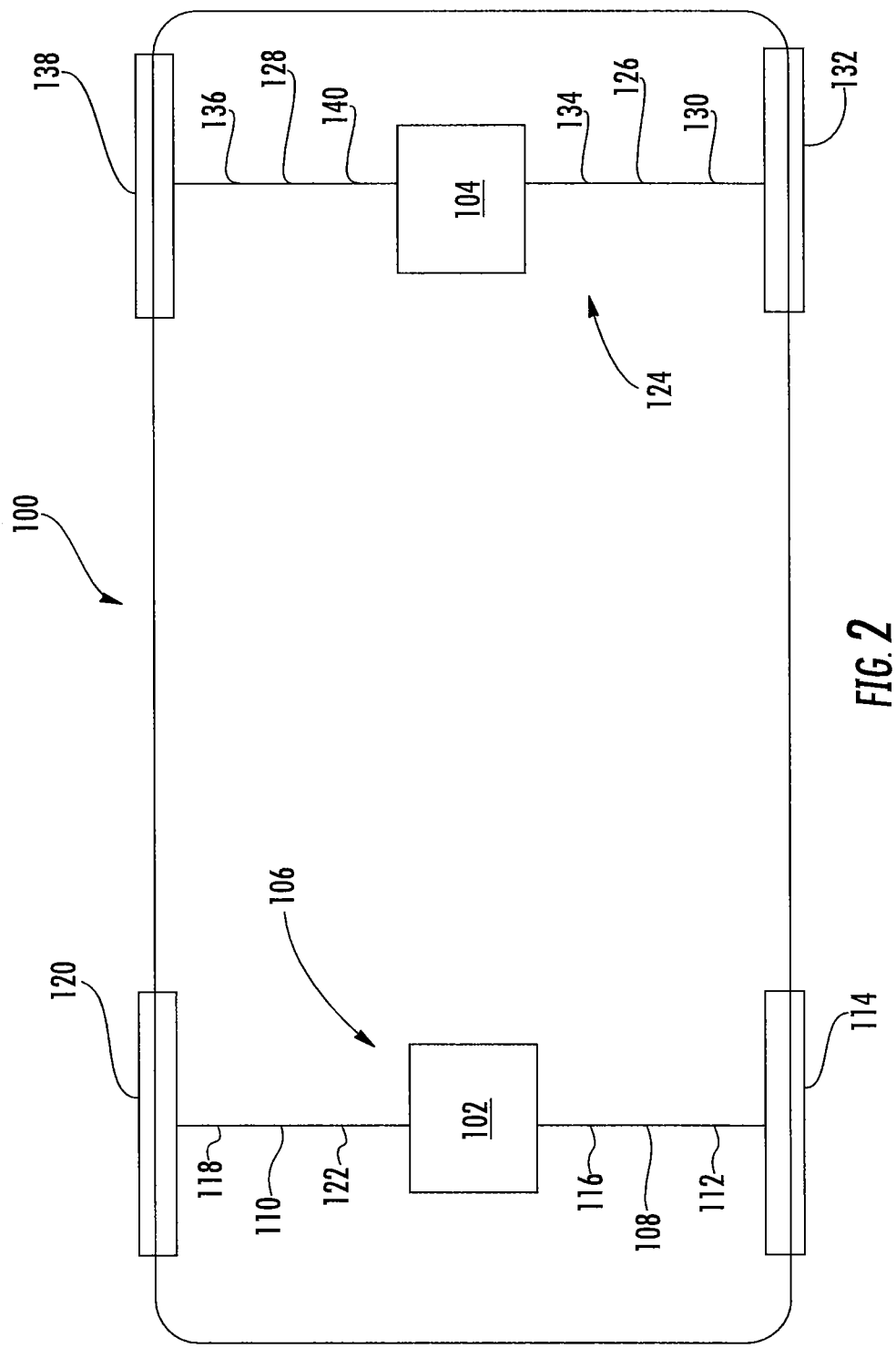
FIG. 2 is a schematic top-plan view of another vehicle having drive unit assemblies according to an embodiment of the disclosure.

FIG. 2 is a schematic top-plan view of another vehicle 100 having a forward drive unit assembly 102 and a rear drive unit assembly 104 according to an embodiment of the disclosure. The forward drive unit assembly 102 of the vehicle 100 provides the rotational power necessary to drive a forward axle system 106. Additionally, according to an embodiment of the disclosure, the forward drive unit assembly 102 also provides torque vectoring capabilities thereby allowing the amount of rotational power and/or torque that is transferred to each wheel of the forward axle system 106 to be varied depending on the type driving conditions that the vehicle 100 is in. The rotational power is transmitted through the forward axle system 106 as described in more detail below.

As illustrated in FIG. 2, the forward axle system 106 further includes a first forward axle half shaft 108 and a second forward axle half shaft 110. A first end 112 of the first forward axle half shaft 108 is drivingly connected to a first forward axle wheel assembly 114 and a second end 116 of the first forward axle half shaft 108 is drivingly connected to an end of the forward drive unit assembly 102. In a non-limiting example, the second end 116 of the first forward axle half shaft 108 is drivingly connected to a forward axle differential side gear, a first forward drive unit output shaft, a separate stub shaft, a separate coupling shaft, a first forward axle differential output shaft and/or a shaft that is formed as part of a forward axle differential side gear.

A first end 118 of the second forward axle half shaft 110 is drivingly connected to a second forward axle wheel assembly 120 and a second end 122 of the second forward axle half shaft 110 is drivingly connected to an end of the forward drive unit assembly 102 opposite the first forward axle half shaft 108. In a non-limiting example, the second end 122 of the second forward axle half shaft 110 is drivingly connected to a forward axle differential side gear, a second forward drive unit output shaft, a separate stub shaft, a separate coupling shaft, a second forward axle differential output shaft and/or a shaft that is formed as part of a forward axle differential side gear.

The rear drive unit assembly 104 of the vehicle 100 provides the rotational power necessary to drive a rear axle system 124. Additionally, according to an embodiment of the disclosure, the rear drive unit assembly 104 also provides torque vectoring capabilities thereby allowing the amount of rotational power and/or torque that is transferred to each wheel of the rear axle system 124 to be varied depending on the type driving conditions that the vehicle 100 is in. The rotational power is transmitted through the forward axle system 124 as described in more detail below.

As illustrated in FIG. 2, the rear axle system 124 further includes a first rear axle half shaft 126 and a second rear axle half shaft 128. A first end 130 of the first rear axle half shaft 126 is drivingly connected to a first rear axle wheel assembly 132 and a second end 134 of the first rear axle half shaft 126 is drivingly connected to an end of the rear drive unit assembly 104. In a non-limiting example, the second end 134 of the first rear axle half shaft 126 is drivingly connected to a rear axle differential side gear, a first rear drive unit output shaft, a separate stub shaft, a separate coupling shaft, a first rear axle differential output shaft and/or a shaft that is formed as part of a rear axle differential side gear.

A first end 136 of the second rear axle half shaft 128 is drivingly connected to a second rear axle wheel assembly 138 and a second end 140 of the second rear axle half shaft 128 is drivingly connected to an end of the rear drive unit assembly 104 opposite the first rear axle half shaft 126. In a non-limiting example, the second end 140 of the second rear axle half shaft 128 is drivingly connected to a rear axle differential side gear, a second rear drive unit output shaft, a separate stub shaft, a separate coupling shaft, a second rear axle differential output shaft and/or a shaft that is formed as part of a rear axle differential side gear.

Figure 3:
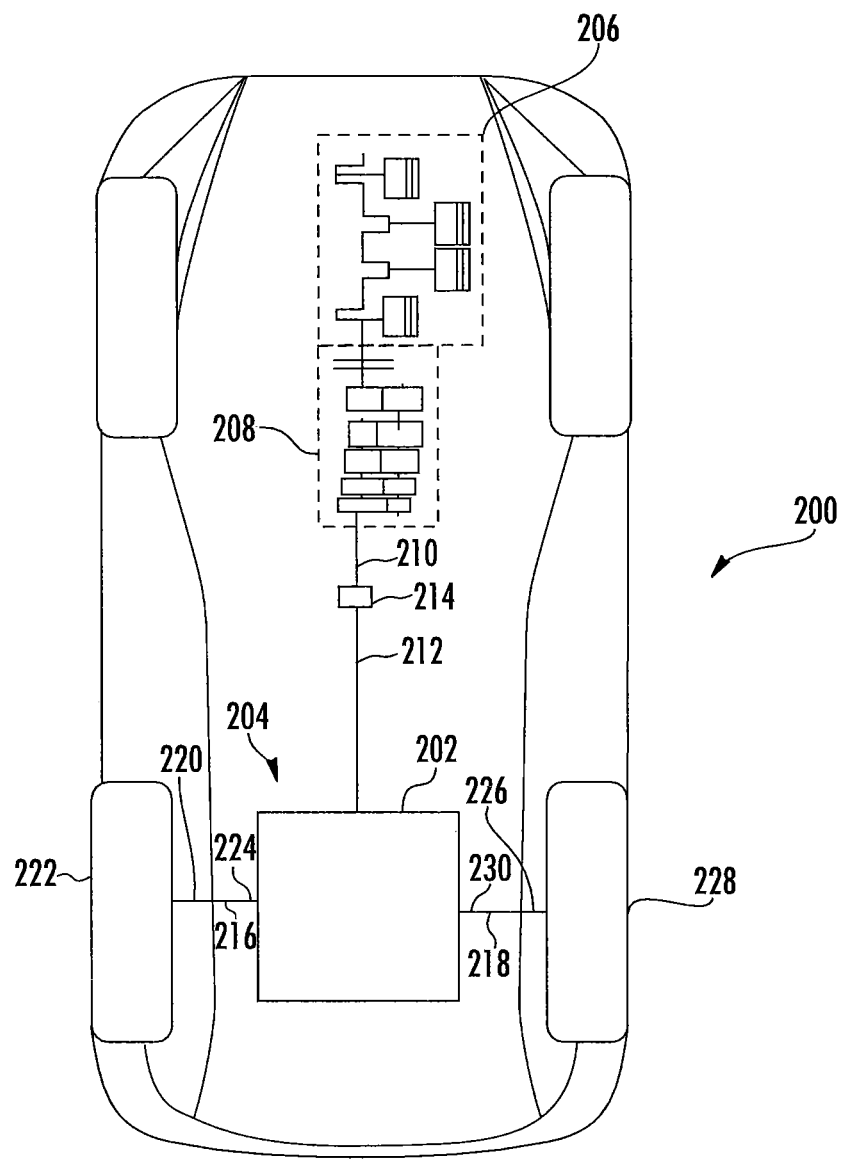
FIG. 3 is a schematic top-plan view of a vehicle having a hybrid drive unit assembly according to an embodiment of the disclosure.

FIG. 3 is a schematic top-plan view of a vehicle 200 having a hybrid drive unit assembly 202 according to an embodiment of the disclosure. As illustrated in FIG. 3 of the disclosure, the vehicle 200 is a rear wheel drive type vehicle. In order to provide the rotational necessary to drive a rear axle system 204 the vehicle 200 includes an engine 206. It is within the scope of this disclosure that the engine 206 may be an electric motor, an internal combustion engine, a gas turbine and/or a stream turbine.

The engine 206 of the vehicle 200 is drivingly connected to a transmission 208. A transmission output shaft 210 is then drivingly connected to an end of the transmission 208 opposite the engine 206. The transmission 208 is a power management system, which provides controlled application of the rotational power generated by the engine 206 by means of a gear box.

An end of the transmission output shaft 210 is drivingly connected to an end of a drive shaft 212 via a connector 214. As a non-limiting example, the connector 214 is a universal joint, a U-joint, a universal coupling, a cardan joint, a double cardan joint, a Hooke's joint, a Spicer joint, a homokinetic coupling, a constant velocity joint or a Hardy Spicer joint. The drive shaft 212 drivingly connects the transmission 208 to the hybrid drive unit assembly 202 of the vehicle 200.

Drivingly connected to an end of the drive shaft 212 is the hybrid drive unit assembly 202. As a non-limiting example, the drive shaft 212 is drivingly connected a rear axle input shaft, a rear differential input shaft, a hybrid drive unit input shaft, a coupling shaft, a stub shaft and/or a rear differential pinion shaft. Additionally, as a non-limiting example, the end of the drive shaft 212 opposite the transmission output shaft 210 is drivingly connected to the hybrid drive unit assembly 202 by using a universal joint, a U-joint, a universal coupling, a cardan joint, a double cardan joint, a Hooke's joint, a Spicer joint, a homokinetic coupling, a constant velocity joint or a Hardy Spicer joint.

The engine 206 of the vehicle 200 in combination with the hybrid drive unit assembly 202 provides the rotational power necessary to drive the rear axle system 204 of the vehicle 200. Additionally, according to an embodiment of the disclosure, the hybrid drive unit assembly 202 also provides torque vectoring capabilities thereby allowing the amount of rotational power and/or torque that is transferred to each wheel of the rear axle system 204 to be varied depending on the type driving conditions that the vehicle 200 is in. The rotational power is transmitted through the rear axle system 204 as described in more detail below.

As illustrated in FIG. 3, the rear axle system 204 further includes a first rear axle half shaft 216 and a second rear axle half shaft 218. A first end 220 of the first rear axle half shaft 216 is drivingly connected to a first rear axle wheel assembly 222 and a second end 224 of the first rear axle half shaft 216 is drivingly connected to an end of the hybrid drive unit assembly 202. In a non-limiting example, the second end 224 of the first rear axle half shaft 216 is drivingly connected to a rear axle differential side gear, a first hybrid drive unit output shaft, a separate stub shaft, a separate coupling shaft, a first rear axle differential output shaft and/or a shaft that is formed as part of a rear axle differential side gear.

A first end 226 of the second rear axle half shaft 218 is drivingly connected to a second rear axle wheel assembly 228 and a second end 230 of the second rear axle half shaft 218 is drivingly connected to an end of the hybrid drive unit assembly 202 opposite the first rear axle half shaft 216. In a non-limiting example, the second end 230 of the second rear axle half shaft 218 is drivingly connected to a rear axle differential side gear, a second hybrid drive unit output shaft, a separate stub shaft, a separate coupling shaft, a second rear axle differential output shaft and/or a shaft that is formed as part of a rear axle differential side gear.

Figure 4:
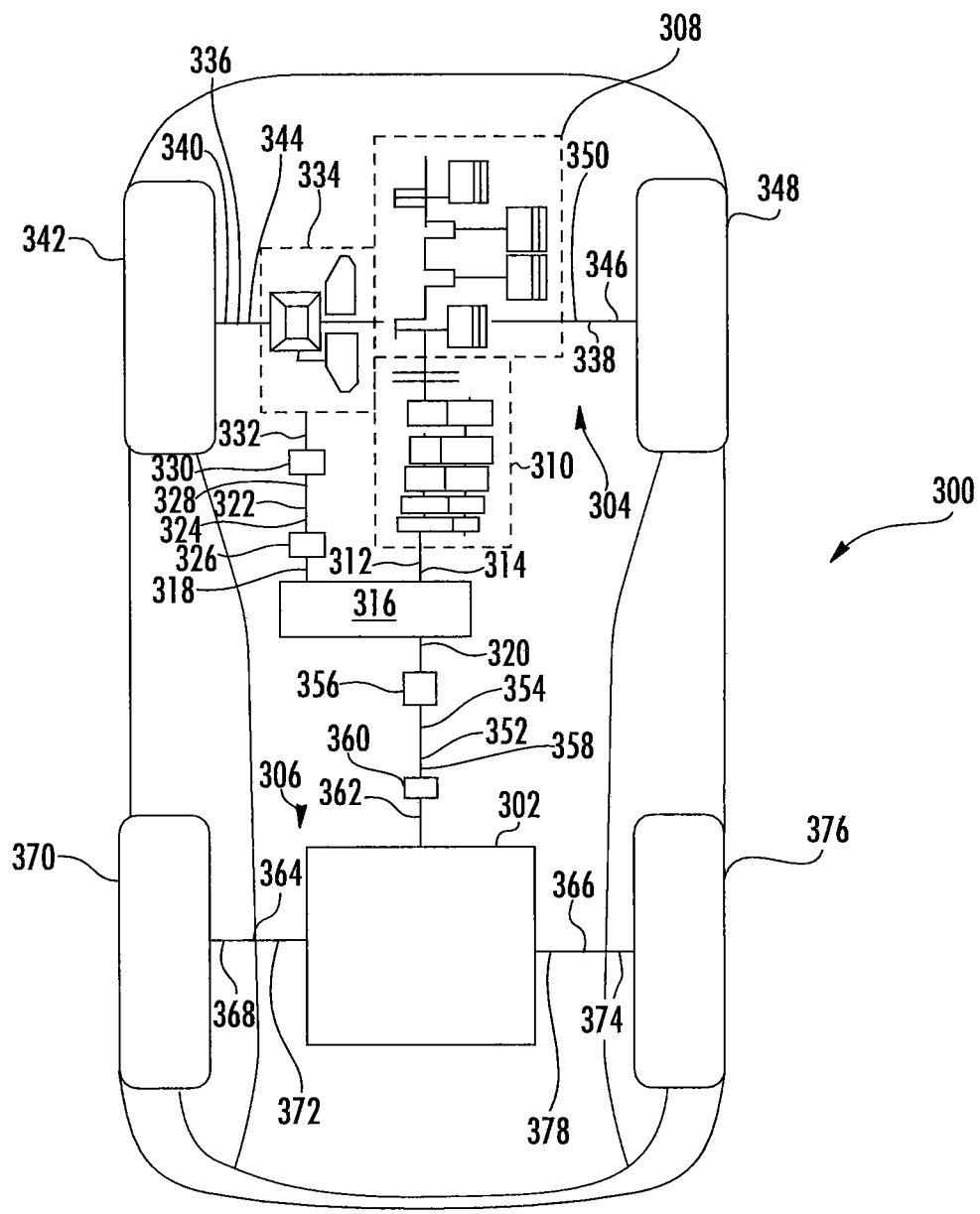
FIG. 4 is a schematic top-plan view of a vehicle having a rear hybrid drive unit assembly according to an embodiment of the disclosure.

FIG. 4 is a schematic top-plan view of a vehicle 300 having a rear hybrid drive unit assembly 302 according to an embodiment of the disclosure. As illustrated in FIG. 4 of the disclosure, the vehicle 300 is a 4-wheel drive or an all-wheel drive (AWD) type vehicle. In order to provide the rotational necessary to drive a forward axle system 304 and a rear axle system 306 the vehicle 300 includes an engine 308. It is within the scope of this disclosure that the engine 308 may be an electric motor, an internal combustion engine, a gas turbine and/or a stream turbine.

The engine 308 of the vehicle 300 is drivingly connected to a transmission 310. A transmission output shaft 312 is then drivingly connected to an end of the transmission 310 opposite the engine 308. The transmission 310 is a power management system, which provides controlled application of the rotational power generated by the engine 308 by means of a gear box.

An end of the transmission output shaft 312 opposite the transmission 310 is drivingly connected to a transfer case input shaft 314, which in turn is drivingly connected to a transfer case 316. The transfer case 316 is used in four-wheel drive and/or AWD vehicles to transfer the rotational power from the transmission 310 to the forward axle system 304 and the rear axle system 306 by utilizing a series of gears and drive shafts. The transfer case 316 additionally allows the vehicle 300 to selectively operate in either a two-wheel drive mode of a four-wheel/AWD mode. The transfer case 316 includes a first transfer case output shaft 318 and a second transfer case output shaft 320.

A first drive shaft 322 extends from the first transfer case output shaft 318 to the forward axle system 304 of the vehicle 300. A first end 324 of the first drive shaft 322 is drivingly connected to an end of the first transfer case output shaft 318 opposite the transfer case 316 via a coupling 326. As a non-limiting example, the coupling 326 is a universal joint, a U-joint, a universal coupling, a cardan joint, a double cardan joint, a Hooke's joint, a Spicer joint, a homokinetic coupling, a constant velocity joint or a Hardy Spicer joint. A second end 328 of the first drive shaft 322 is drivingly connected to a second coupling 330. As a non-limiting example, the second coupling 330 is a universal joint, a U-joint, a universal coupling, a cardan joint, a double cardan joint, a Hooke's joint, a Spicer joint, a homokinetic coupling, a constant velocity joint or a Hardy Spicer joint.

Drivingly connected to an end of the second coupling 330 opposite the first drive shaft 322 is an end of a forward axle system input shaft 332. In a non-limiting example, the forward axle system input shaft 332 is a forward axle input shaft, a forward differential input shaft, a forward hybrid drive unit input shaft, a coupling shaft, a stub shaft and/or a forward differential pinion. Drivingly connected to an end of the forward axle system input shaft 332 opposite the first drive shaft 322 is a forward axle differential assembly 334. The forward axle differential is a set of gears that allows the outer drive wheel(s) of the wheeled vehicle 300 to rotate at a faster rate that the inner drive wheel(s). The rotational power is transmitted through the forward axle system 304 as described in more detail below.

As illustrated in FIG. 4, the forward axle system 304 further includes a first forward axle half shaft 336 and a second forward axle half shaft 338. The first forward axle half shaft 336 extends substantially perpendicular to the forward axle system input shaft 332. A first end 340 of the first forward axle half shaft 336 is drivingly connected to a first forward axle wheel assembly 342 and a second end 344 of the first forward axle half shaft 336 is drivingly connected to an end of the forward axle differential assembly 334. In a non-limiting example, the second end 344 of the first forward axle half shaft 336 is drivingly connected to a forward axle differential side gear, a first forward hybrid drive unit output shaft, a separate stub shaft, a separate coupling shaft, a first forward axle differential output shaft and/or a shaft that is formed as part of a forward axle differential side gear.

The second forward axle half shaft 338 also extends substantially perpendicular to the forward axle system input shaft 332. A first end 346 of the second forward axle half shaft 338 is drivingly connected to a second forward axle wheel assembly 348 and a second end 350 of the second forward axle half shaft 338 is drivingly connected to an end of the forward axle differential assembly 334 opposite the first forward axle half shaft 336. In a non-limiting example, the second end 350 of the second forward axle half shaft 338 is drivingly connected to a forward axle differential side gear, a second forward hybrid drive unit output shaft, a separate stub shaft, a separate coupling shaft, a second forward axle differential output shaft and/or a shaft that is formed as part of a forward axle differential side gear.

An end of the second transfer case output shaft 320 is drivingly connected to an end of the transfer case 316 opposite the transfer case input shaft 314. A second drive shaft 352 extends from the second transfer case output shaft 320 to the rear axle system 306 of the vehicle 300. A first end 354 of the second drive shaft 352 is drivingly connected to an end of the second transfer case output shaft 320 opposite the transfer case 316 via a coupling 356. As a non-limiting example, the coupling 356 is a universal joint, a U-joint, a universal coupling, a cardan joint, a double cardan joint, a Hooke's joint, a Spicer joint, a homokinetic coupling, a constant velocity joint or a Hardy Spicer joint. A second end 358 of the second drive shaft 352 is drivingly connected to a second coupling 360. As a non-limiting example, the second coupling 360 is a universal joint, a U-joint, a universal coupling, a cardan joint, a double cardan joint, a Hooke's joint, a Spicer joint, a homokinetic coupling, a constant velocity joint or a Hardy Spicer joint.

Drivingly connected to an end of the second coupling 360 is an end of a rear axle system input shaft 362. In a non-limiting example, the rear axle system input shaft 362 is a rear axle differential input shaft, a rear hybrid drive unit input shaft, a coupling shaft, stub shaft or a rear axle differential pinion shaft. Drivingly connected to an end of the rear axle system input shaft 362 opposite the second drive shaft 352 is the rear hybrid drive unit assembly 302. The rear hybrid drive unit assembly 302 in combination with the engine 308 provides the rotational power necessary to drive the rear axle system 306 of the vehicle 300. Additionally, according to an embodiment of the disclosure, the rear hybrid drive unit assembly 302 also provides torque vectoring capabilities thereby allowing the amount of rotational power and/or torque that is transferred to each wheel of the rear axle system 306 to be varied depending on the type driving conditions that the vehicle 300 is in. The rotational power is transmitted through the rear axle system 306 as described in more detail below.

As illustrated in FIG. 4, the rear axle system 306 further includes a first rear axle half shaft 364 and a second rear axle half shaft 366. A first end 368 of the first rear axle half shaft 364 is drivingly connected to a first rear axle wheel assembly 370 and a second end 372 of the first rear axle half shaft 364 is drivingly connected to an end of the rear hybrid drive unit assembly 302. In a non-limiting example, the second end 372 of the first rear axle half shaft 364 is drivingly connected to a rear axle differential side gear, a first rear hybrid drive unit output shaft, a separate stub shaft, a separate coupling shaft, a first rear axle differential output shaft and/or a shaft that is formed as part of a rear axle differential side gear.

A first end 374 of the second rear axle half shaft 366 is drivingly connected to a second rear axle wheel assembly 376 and a second end 378 of the second rear axle half shaft 366 is drivingly connected to an end of the rear hybrid drive unit assembly 302 opposite the first rear axle half shaft 364. In a non-limiting example, the second end 378 of the second rear axle half shaft 366 is drivingly connected to a rear axle differential side gear, a second rear hybrid drive unit output shaft, a separate stub shaft, a separate coupling shaft, a second rear axle differential output shaft and/or a shaft that is formed as part of a rear axle differential side gear.

Figure 5:
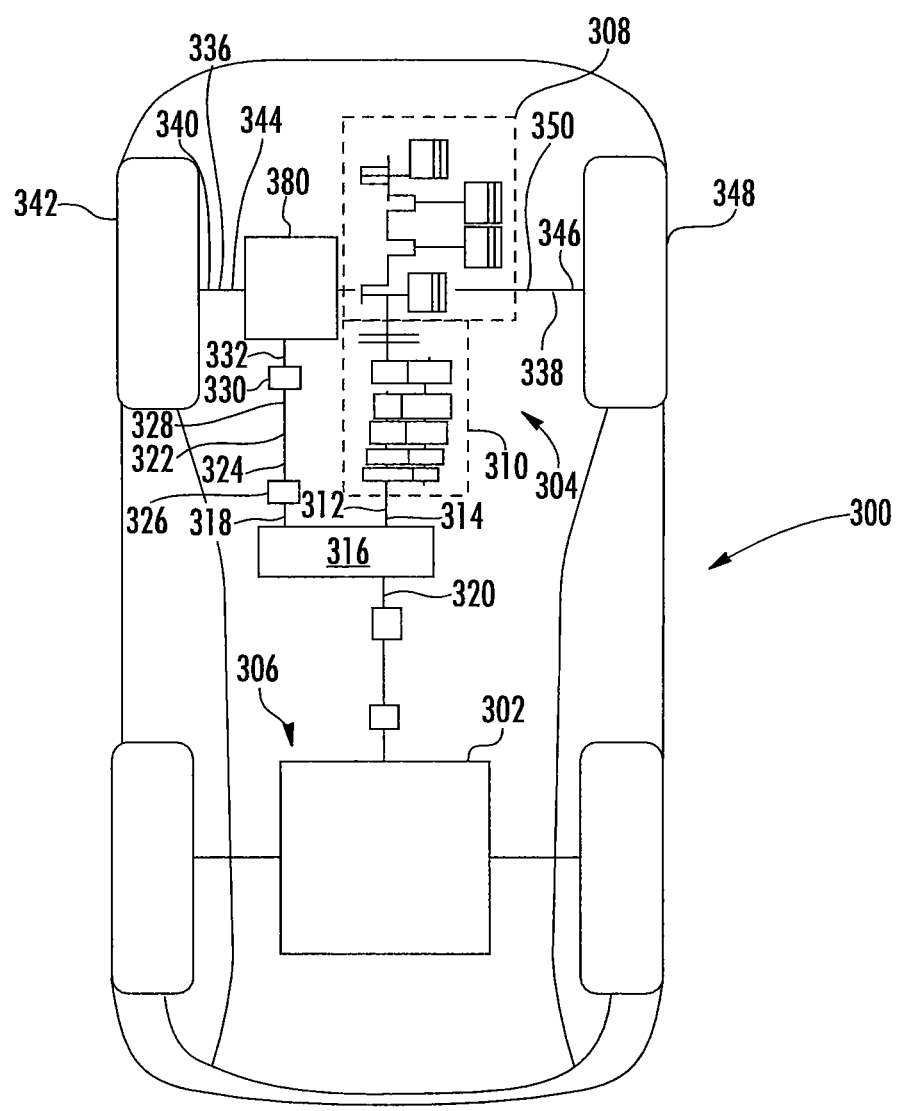
FIG. 5 is a schematic top-plan view of the vehicle illustrated in FIG. 4 having a forward hybrid drive unit assembly and a rear hybrid drive unit assembly according to an embodiment of the disclosure.

FIG. 5 is a schematic top-plan view of the vehicle 300 illustrated in FIG. 4 having a forward hybrid drive unit assembly 380 and a rear hybrid drive unit assembly 302 according to an embodiment of the disclosure. The vehicle 300 illustrated in FIG. 5 is the same as the vehicle 300 illustrated in FIG. 4, except where specifically noted below. As previously discussed in relation to FIG. 4 of the disclosure, the vehicle 300 illustrated in FIG. 5 is a 4-wheel drive or an AWD type vehicle. In order to provide the rotational necessary to drive a forward axle system 304 and a rear axle system 306 the vehicle 300 includes an engine 308

Drivingly connected to an end of the forward axle system input shaft 332 is the forward hybrid drive unit assembly 380. In a non-limiting example, the forward axle system input shaft 332 is a forward axle input shaft, a forward differential input shaft, a forward hybrid drive unit input shaft, a coupling shaft, a stub shaft and/or a forward differential pinion.

The forward hybrid drive unit assembly 380 in combination with the engine 308 provides the rotational power necessary to drive the forward axle system 304 of the vehicle 300. Additionally, according to an embodiment of the disclosure, the forward hybrid drive unit assembly 380 also provides torque vectoring capabilities thereby allowing the amount of rotational power and/or torque that is transferred to each wheel of the forward axle system 304 to be varied depending on the type driving conditions that the vehicle 300 is in. The rotational power is transmitted through the forward axle system 304 as described in more detail below.

As illustrated in FIG. 5 of the disclosure, the forward axle system 304 further includes a first forward axle half shaft 336 and a second forward axle half shaft 338. The first forward axle half shaft 336 extends substantially perpendicular to the forward axle system input shaft 332. A first end 340 of the first forward axle half shaft 336 is drivingly connected to a first forward axle wheel assembly 342 and a second end 344 of the first forward axle half shaft 338 is drivingly connected to an end of the forward hybrid drive unit assembly 380. In a non-limiting example, the second end 344 of the first forward axle half shaft 336 is drivingly connected to a forward axle differential side gear, a first forward hybrid drive unit output shaft, a separate stub shaft, a separate coupling shaft, a first forward axle differential output shaft and/or a shaft that is formed as part of a forward axle differential side gear.

The second forward axle half shaft 338 also extends substantially perpendicular to the forward axle system input shaft 332. A first end 346 of the second forward axle half shaft 338 is drivingly connected to a second forward axle wheel assembly 348 and a second end 350 of the second forward axle half shaft 338 is drivingly connected to an end of the forward hybrid drive unit assembly 380 opposite the first forward axle half shaft 336. In a non-limiting example, the second end 350 of the second forward axle half shaft 338 is drivingly connected to a forward axle differential side gear, a second forward hybrid drive unit output shaft, a separate stub shaft, a separate coupling shaft, a second forward axle differential output shaft and/or a shaft that is formed as part of a forward axle differential side gear.

Figure 6:
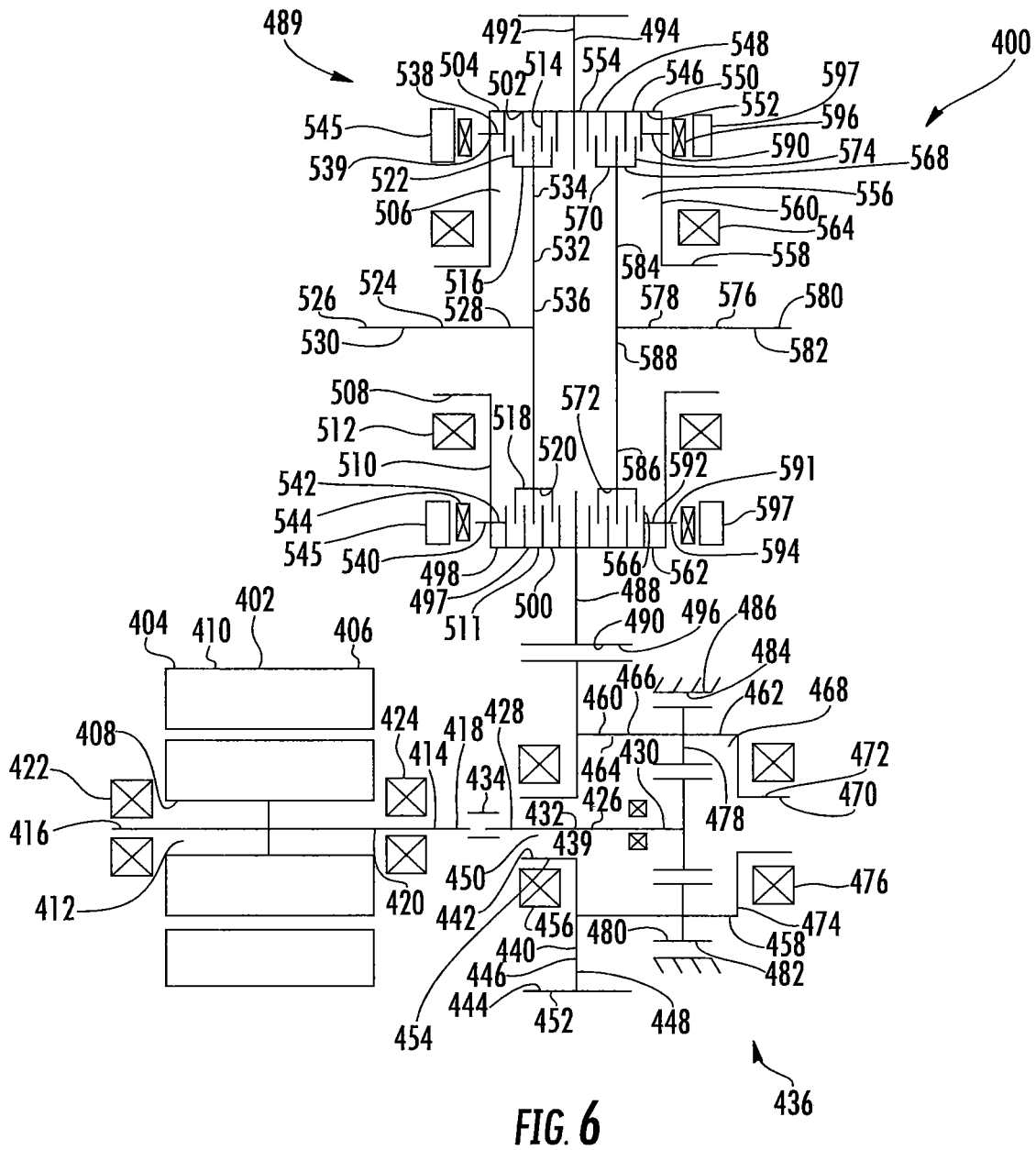
FIG. 6 is a schematic illustration of a drive unit assembly according to an embodiment of the disclosure.

FIG. 6 is a schematic illustration of a drive unit assembly 400 according to an embodiment of the disclosure. The drive unit assembly 400 includes an electric motor 402 having a first end 404, a second end 406, an inner surface 408 and an outer surface 410. The inner surface 408 and the outer surface 410 of the electric motor 402 defines a hollow portion 412 therein. As a non-limiting example, the drive unit assembly 400 may be a forward drive unit and/or a rear drive unit for a hybrid vehicle and/or an electric drive vehicle. The electric motor 402 provides the rotational power necessary to drive a forward axle system (not shown) and/or a rear axle system (not shown) of a vehicle (not shown).

Extending co-axially with the electric motor 402 of the drive unit assembly 400 is an electric motor spindle or an electric motor output shaft 414 having a first end portion 416 a second end portion 418 and an outer surface 420. At least a portion of the inner surface 408 of the electric motor 402 is drivingly connected to at least a portion of the outer surface 420 of the electric motor spindle or electric motor output shaft 414.

The electric motor spindle or electric motor output shaft 414 is rotationally supported by a first electric motor spindle or electric motor output shaft bearing 422 and/or a second electric motor spindle or electric motor output shaft bearing 424. The first electric motor spindle or electric motor output shaft bearing 422 is co-axial with the electric motor spindle or electric motor output shaft 414 and is disposed axially outboard from and is adjacent to the first end 404 of the electric motor 402. Additionally, at least a portion of the first electric motor spindle or electric motor output shaft bearing 422 is in direct contact with at least a portion of the outer surface 420 of the electric motor spindle or electric motor output shaft 414.

The second electric motor spindle or electric motor output shaft bearing 424 is co-axial with the electric motor spindle or electric motor output shaft 414 and is disposed axially outboard from and is adjacent to the second end 406 of the electric motor 402. At least a portion of the second electric motor spindle or electric motor output shaft bearing 424 is in direct contact with at least a portion of the outer surface 420 of the electric motor spindle or electric motor output shaft 414.

In accordance with this embodiment of the disclosure, the electric motor 402 is attached to at least a portion of a drive unit housing (not shown), a forward axle housing (not shown) and/or a rear axle housing (not shown). As a non-limiting example, the electric motor 402 may be attached to the drive unit housing (not shown), the forward axle housing (not shown) and/or the rear axle housing (not shown) by using one or more welds, one or more mechanical fasteners and/or any other method of securing an electric motor to a housing. By making the electric motor 402 a bolt-on type motor it allows the electric motor 402 to be replaced and/or repaired. Additionally, by making the electric motor 402 a bolt-on type motor it allows original equipment manufacturers (OEMs) to specify the type of motor, the motor design and/or the supplier of the motor that can be used in connection with the drive unit assembly 400. This makes the drive unit assembly 400 more customizable allowing the drive unit assembly 400 to be optimized and tailored to fit any vehicle and/or any vehicle application.

A planetary gear input shaft 426 having a first end portion 428, a second end portion 430 and an outer surface 433 extends co-axially with the electric motor spindle or electric motor output shaft 414. At least a portion of the first end portion 428 of the planetary gear input shaft 426 is drivingly connected to at least a portion of the second end portion 418 of the electric motor spindle or electric motor output shaft 414 via a connecting portion 434. As a non-limiting example, the connecting portion 434 may drivingly connect the first end portion 428 of the planetary gear input shaft 426 to the second end portion 418 of the electric motor spindle or electric motor output shaft 414 by using a splined connection, a threaded connection, one or more snap rings, one or more welds, one or more adhesives, one or more mechanical fasteners, a dog clutch assembly and/or any other method of drivingly connecting one rotating shaft to another rotating shaft.

According to an embodiment of the disclosure and as a non-limiting example, the connecting portion 434 may be a dog clutch assembly that selectively engages and disengages the electric motor 402 with the planetary gear input shaft 426. In accordance with the embodiment of the disclosure where the connecting portion 434 is the dog clutch assembly, the drive unit assembly 400 may further include a synchronizing device (not shown) that will monitor and control the rotational speed of the electric motor 402 to allow for rapid connect and/or disconnect of the dog clutch assembly. Additionally, by incorporating the use of the synchronizing device (not shown) the amount of NVH experienced by the drive unit assembly 400 during the connection and/or disconnection of the electric motor spindle or electric motor output shaft 414 to the planetary gear input shaft 426 can be reduced.

Drivingly connected to at least a portion of the second end portion 430 of the planetary gear input shaft 426 is a sun gear 435 of the planetary gear assembly 436. The sun gear 435 of the planetary gear assembly 436 is co-axial with the planetary gear input shaft 426. Circumferentially extending from at least a portion of an outer surface of the sun gear 435 is a plurality of gear teeth 438. It is within the scope of this disclosure and as a non-limiting example, the plurality of gear teeth 438 extending from the outer surface of the sun gear 435 are a plurality of hypoid gear teeth, spiral bevel gear teeth, helical gear teeth, spur gear teeth, double hypoid gear teeth, double spiral bevel gear teeth or double helical gear teeth.

According to an embodiment of the disclosure (not shown), the sun gear is spliningly engaged with at least a portion of the outer surface of the second end portion of the planetary gear input shaft. In accordance with this embodiment of the disclosure (not shown), a plurality of splines circumferentially extend from at least a portion of the outer surface of the second end portion of the planetary gear input shaft. Additionally, in accordance with this embodiment of the disclosure (not shown), the sun gear has an inner surface and an outer surface defining a hollow portion therein. Circumferentially extending from at least a portion of the inner surface of the sun gear is a plurality of splines that are complementary to and meshingly engaged with the plurality of splines on the outer surface of the second end portion of the planetary gear input shaft.

According to an alternative embodiment of the disclosure (not shown), the sun gear may be integrally connected to at least a portion of the outer surface of the second end portion of the planetary gear input shaft by using one or more welds and/or one or more mechanical fasteners.

In accordance with yet another alternative embodiment of the disclosure, the sun gear 435 may be integrally formed as part of the second end portion 430 of the planetary gear input shaft 426. In accordance with this embodiment of the disclosure, the sun gear 435 may be cast as part of the planetary gear input shaft 426 or machined into the second end portion 430 of the planetary gear input shaft 426.

In accordance with still another embodiment of the disclosure (not shown), the sun gear is integrally connected to at least a portion of the outer surface of the second end portion of the electric motor spindle or electric motor output shaft. According to this embodiment of the disclosure (not shown), the drive unit assembly 400 does not include the connecting portion 434 or the planetary gear input shaft 426.

As a non-limiting example, the sun gear may be integrally connected to at least a portion of the outer surface of the electric motor spindle or electric motor output shaft by a complementary set of splines, one or more welds, one or more mechanical fasteners, machined into the second end portion of the electric motor spindle or electric motor output shaft and/or cast as part of the electric motor spindle or electric motor output shaft.

Disposed between the electric motor 402 and the sun gear 435 of the planetary gear assembly 436 is a planetary gear assembly pinion gear 440 having an inner surface 442, an outer surface 444, a first side 446 and a second side 448. The inner surface 442 and the outer surface 444 of the planetary gear assembly pinion gear 440 defines a hollow portion 450 therein. Additionally, the planetary gear assembly pinion gear 440 is co-axial with the electric motor spindle or electric motor output shaft 414. Circumferentially extending from at least a portion of the outer surface 444 of the planetary gear assembly pinion gear 440 is a plurality of gear teeth 452. It is within the scope of this disclosure and as a non-limiting example, the plurality of gear teeth 452 extending from the outer surface 444 of the planetary gear assembly pinion gear 440 are a plurality of hypoid gear teeth, spiral bevel gear teeth, helical gear teeth, spur gear teeth, double hypoid gear teeth, double spiral bevel gear teeth or double helical gear teeth.

A protruding portion 454 extends axially outboard from the first side 446 of the planetary gear assembly pinion gear 440 toward the electric motor 402. Disposed radially outboard from and adjacent to the protruding portion 454 of the planetary gear assembly pinion gear 440 is a pinion bear bearing 456. The pinion gear bearing 456 provides rotational and/or axial load support for the planetary gear assembly pinion gear 440 when in operation.

Integrally connected to the second side 448 of the planetary gear assembly pinion gear 440 is a planetary gear housing 458 having a first end portion 460, a second end portion 462, an inner surface 464 and an outer surface 466. The inner surface 464 and the outer surface 466 of the planetary gear housing 458 defines a hollow portion 468 therein. Additionally, the planetary gear housing 458 extends co-axially with the electric motor spindle or electric motor output shaft 414 and axially outboard from the second side 448 of the planetary gear assembly pinion gear 440. As a non-limiting example, the first end portion 460 of the planetary gear housing 458 may be attached to the pinion gear 400 by using one or more welds (not shown) and/or one or more mechanical fasteners (not shown). Additionally, as a non-limiting example, the first end portion 460 of the planetary gear housing 458 may be integrally formed as part of the pinion gear 440.

Extending from the inner surface 464 to the outer surface 466 of the planetary gear housing 458 is one or more planetary gear housing openings (not shown).

At least a portion of the second end portion 462 of the planetary gear housing 458 has a reduced diameter portion 470 having an outer surface 472 and a radially extending wall 474. As a non-limiting example, the reduced diameter portion 470 of the planetary gear housing 458 may be solid or at least partially hollow.

Disposed radially outboard from the outer surface 472 of the reduced diameter portion 470 of the planetary gear housing 458 is a planetary gear housing bearing 476. The planetary gear housing bearing 476 provides rotational support and/or axial load support for the planetary gear housing 458 when in operation.

Disposed radially outboard from the electric motor spindle or electric motor output shaft 414 and the sun gear 435 of the planetary gear assembly 436 is one or more planetary gears 478 having an inner surface (not shown) and an outer surface 480 defining a hollow portion (not shown) therein. At least a portion of the inner surface (not shown) of the one or more planetary gears 478 is rotatively connected to at least a portion of the planetary gear housing 458 thereby rotatively and drivingly connecting the one or more planetary gear 478 to the planetary gear housing 458. As a non-limiting example, the one or more planetary gears 478 are rotatively connected to one or more rods (not shown), one or more pins (not shown), one or more bolts (not shown) and/or one or more mechanical fasteners (not shown) that are then integrally connected to at least a portion of the planetary gear housing 458.

Circumferentially extending from at least a portion of the outer surface 480 of the one or more planetary gears 478 is a plurality of gear teeth 482. The plurality of gear teeth 482 extending from the outer surface 480 of the one or more planetary gears 478 are complementary to and meshingly engaged with the plurality of gear teeth 438 extending from the outer surface of the sun gear 435. As a non-limiting example, the plurality of gear teeth 482 extending from the outer surface 480 of the one or more planetary gears 478 are a plurality of hypoid gear teeth, spiral bevel gear teeth, helical gear teeth, spur gear teeth, double hypoid gear teeth, double spiral bevel gear teeth or double helical gear teeth.

At least a portion of the one or more planetary gears 478 extend through the one or more planetary housing openings (not shown) and outside the planetary gear housing 458. The one or more planetary gears 478 extend outside the planetary gear housing 458 till at least a portion of the plurality of gear teeth 482 on the outer surface 480 of the one or more planetary gears 478 are meshingly engaged with a complementary plurality of gear teeth 484 extending from an inner surface of a housing 486. As a non-limiting example, the plurality of gear teeth 484 extending from the inner surface of the housing 486 are a plurality of hypoid gear teeth, spiral bevel gear teeth, helical gear teeth, spur gear teeth, double hypoid gear teeth, double spiral bevel gear teeth or double helical gear teeth. The plurality of gear teeth 484 on the inner surface of the housing 486 form a planetary ring gear.

In accordance with an embodiment of the disclosure, the drive unit assembly 400 may further include the use of a sun gear bearing 439 that is disposed radially outboard from the second end portion 430 of the planetary gear input shaft 426 and axially inboard from the sun gear 435. Additionally, the sun gear bearing 439 is disposed within the planetary gear housing 458 between the sun gear 435 and the second side 448 of the planetary gear assembly pinion gear 440. The sun gear bearing 439 provides rotational support and/or axial load support for the sun gear 435 and/or the planetary gear input shaft 426 when in operation thereby providing a floating planetary sun gear 435. By providing a floating sun gear 435 it improves the load sharing between the one or more planetary gears 478, it reduces the amount of noise vibration and harshness (NVH) and improves the overall life and durability of the drive unit assembly 400.

According to an alternative embodiment of the disclosure (not shown), the sun gear bearing is disposed axially outboard from the sun gear and interposed between the sun gear and the inner surface radially extending wall on the second end portion of the planetary gear housing. As previously discussed, the sun gear bearing provides rotational support and/or axial load support for the sun gear when in operation thereby providing a floating planetary sun gear.

Disposed radially outboard from the planetary gear assembly pinion gear 440 is a clutching assembly ring gear 488 of a clutching assembly or torque vectoring assembly 489. The clutching assembly ring gear 488 has an outer surface 490 a first side 492 and a second side 494. Circumferentially extending from at least a portion of the outer surface 490 of the clutching assembly ring gear 488 is a plurality of gear teeth 496 that are complementary to and meshingly engaged with the plurality of gear teeth 452 on the outer surface 444 of the planetary gear assembly pinion gear 440. As a non-limiting example, the plurality of gear teeth 496 extending from the outer surface 490 of the clutching assembly ring gear 488 are a plurality of hypoid gear teeth, spiral bevel gear teeth, helical gear teeth, spur gear teeth, double hypoid gear teeth, double spiral bevel gear teeth or double helical gear teeth.

Integrally connected to the first side 492 of the clutching assembly ring gear 488 is a first clutch drum 497 having a first end portion 498, a second end portion 500, an inner surface 502 and an outer surface 504. The inner surface 502 and the outer surface 504 of the first clutch drum 497 defines a hollow portion 506 therein. As illustrated in FIG. 6 of the disclosure the first clutch drum 497 is substantially cylindrical in shape. As a non-limiting example, the first clutch drum 497 is integrally connected to the first side 492 of the clutching assembly ring gear 488 by using one or more welds, one and/or more mechanical fasteners. Additionally, as a non-limiting example, the first clutch drum 497 may be integrally formed as part of the clutching assembly ring gear 488.

At least a portion of the first end portion 498 of the first clutch drum 497 includes a recessed diameter portion 508 having a radially extending wall 510. The radially extending wall 510 extends radially outboard from the reduced diameter portion 508 to the larger diameter portion 511 of the first clutch drum 497 thereby connecting the reduced diameter portion 508 to the larger diameter portion 511.

Disposed radially outboard from and adjacent to the outer surface 504 of the reduced diameter portion 508 of the first clutch drum 497 is a first clutch drum bearing 512. At least a portion of the first clutch drum bearing 512 is in direct contact with the outer surface 504 of the reduced diameter portion 508 and the radially extending wall 510 of the first clutch drum 497. The first clutch drum bearing 512 provides rotational support and/or axial load support for the first clutch drum 497 when in operation.

Integrally connected to the inner surface 502 of the larger diameter portion 511 of the first clutch drum 497 is a first plurality of clutch plates 514. The first plurality of clutch plates 514 are integrally connected to the inner surface 502 of the larger diameter portion 511 of the first clutch drum 497 and individually fitted to allow sliding movement in the axial direction along the inner surface 502 of the larger diameter portion 511 of the first clutch drum 497.

Disposed within the hollow portion 506 of the larger diameter portion 511 of the first clutch drum 497 is a first clutch can 516 having an inner surface 518 and an outer surface 520. The first clutch can 516 extends co-axially with and is at least partially disposed within the first clutch drum 497 of the drive unit assembly 400. As illustrated in FIG. 6 of the disclosure, the first clutch can 516 is substantially cylindrical in shape.

Integrally connected the outer surface 520 of the first clutch can 516 is a second plurality of clutch plates 522 that are interleafed with the first plurality of clutch plates 514 extending from the inner surface 502 of the first clutch drum 497. The second plurality of clutch plates 522 are integrally connected to the outer surface 520 of the first clutch can 516 and individually fitted to allow sliding movement in the axial direction along the outer surface 520 of the first clutch can 516.

Extending co-axially with the reduced diameter portion 508 and the larger diameter portion 511 of the first clutch drum 497 is a first shaft 524 having a first end portion 526, a second end portion 528 and an outer surface 530. As a non-limiting example, the first shaft 524 is a stub shaft, a coupling shaft and/or a first axle half shaft. Integrally connected to at least a portion of the first end portion 526 of the first shaft 524 is a first axle half shaft (not shown) and/or a first wheel assembly (not shown).

Drivingly connecting the first clutch can 516 to the first shaft 524 is a radially extending portion 532 having a first end portion 534 and a second end portion 536. At least a portion of the first end portion 534 of the radially extending portion 532 is integrally connected to at least a portion of the inner surface 518 of the first clutch can 516. As a non-limiting example the first end portion 534 of the radially extending portion 532 is integrally connected to the first clutch can 516 by using one or more welds and/or one or more mechanical fasteners. Additionally, as a non-limiting example, the first end portion 534 of the radially extending portion 532 is integrally formed as part of the first clutch can 516. The radially extending portion 532 extends radially inward from the first clutch can 516 to the first shaft 524. At least a portion of the second end portion 536 of the radially extending portion 532 is integrally connected to at least a portion of the outer surface 530 of the second end portion 528 of the first shaft 524. As a non-limiting example, the second end portion 536 of the radially extending portion 532 is integrally connected to the second end portion 528 of the first shaft 524 by using one or more welds, one or more mechanical fasteners, one or more snap rings and/or a splined connection. Additionally, as a non-limiting example, the second end portion 536 of the radially extending portion 532 may be integrally formed as part of the first shaft 524.

One or more first thrust pins 538 extend through one or more first thrust pin openings 539 extending from the inner surface 502 to the outer surface 504 of the radially extending wall 510 of the first clutch drum 497. At least a portion of a first end portion 540 of the one or more first thrust pins 538 extends outside the first clutch drum 497 and at least a portion of the second end portion 542 of the one or more first thrust pins 538 extends within the hollow portion 506 of the first clutch drum 497. Additionally, at least a portion of the second end portion 542 of the one or more first thrust pins 538 is in direct contact with the first plurality of clutch plates 514 or the second plurality of clutch plates 522.

Disposed axially outboard from the first end portion 540 of the one or more first thrust pins 538 is a first thrust bearing 544. The first thrust bearing 544 allows at least a portion of a first clutch actuation mechanism 545 to rotate relative to the one or more first thrust pins 538. As a non-limiting example, the first clutch actuation mechanism 545 may be a ball and ramp assembly and/or an actuator. In operation, an amount of force is applied onto an end of the first thrust bearing 544, opposite the one or more first thrust pins 538, until the one or more first thrust pins 538 come into direct contact with the first and/or second plurality of clutch plates 514 and/or 522. This allows the first and second plurality of clutch plates 514 and 522 to be at least variably frictionally engaged with each other thereby allowing a variable amount of rotational energy or torque to be transferred to the first wheel assembly (not shown).

According to the embodiment of the disclosure where the first clutch actuation mechanism 545 is a ball and ramp assembly, the ball and ramp assembly includes a pressure plate, an actuator plate and one or more balls that are disposed between the pressure plate and the actuator plate. It is within the scope of this disclosure that the actuator plate and pressure plate may be either rotating or non-rotating. Additionally, at least a portion of the one or more balls are disposed within one or more grooves on a side of the pressure plate and within one or more grooves on a side of the actuator plate. As the actuator plate and/or the pressure plate is rotated, the actuator plate is translated axially toward the first thrust bearing 544 until the first thrust bearing 544 is in direct contact with the one or more first thrust pins 538. That force then translates the one or more first thrust pins 538 axially toward the first and second plurality of clutch plates 514 and 522 thereby applying an amount of force onto and causing the first and second plurality of clutch plates 514 and 522 to be at least variably frictionally engaged.

Integrally connected to the second side 494 of the clutching assembly ring gear 488 is a second clutch drum 546 having a first end portion 548, a second end portion 550, an inner surface 552 and an outer surface 554. The inner surface 552 and the outer surface 554 of the second clutch drum 546 defines a hollow portion 556 therein. As illustrated in FIG. 6 of the disclosure the second clutch drum 546 is substantially cylindrical in shape. As a non-limiting example, the second clutch drum 546 is integrally connected to the second side 494 of the clutching assembly ring gear 488 by using one or more welds and/or one or more mechanical fasteners. Additionally, as a non-limiting example, the second clutch drum 546 may be integrally formed as part of the clutching assembly ring gear 488.

At least a portion of the second end portion 550 of the second clutch drum 546 includes a recessed diameter portion 558 having a radially extending wall 560. The radially extending wall 560 extends radially outboard from the reduced diameter portion 558 to the larger diameter portion 562 of the second clutch drum 546 thereby connecting the reduced diameter portion 558 to the larger diameter portion 562.

Disposed radially outboard from and adjacent to the outer surface 554 of the reduced diameter portion 558 of the second clutch drum 546 is a second clutch drum bearing 564. At least a portion of the second clutch drum bearing 564 is in direct contact with the outer surface 554 of the reduced diameter portion 558 and the radially extending wall 560 of the second clutch drum 546. The second clutch drum bearing 564 provides rotational support and/or axial load support for the second clutch drum 546 when in operation.

Integrally connected to the inner surface 552 of the larger diameter portion 562 of the second clutch drum 546 is a third plurality of clutch plates 566. The third plurality of clutch plates 566 are integrally connected to the inner surface 522 of the larger diameter portion 564 of the second clutch drum 546 and individually fitted to allow sliding movement in the axial direction along the inner surface 552 of the larger diameter portion 564 of the second clutch drum 546.

Disposed within the hollow portion 556 of the larger diameter portion 564 of the second clutch drum 546 is a second clutch can 568 having an inner surface 570 and an outer surface 572. The second clutch can 568 extends co-axially with and is at least partially disposed within the second clutch drum 546 of the drive unit assembly 400. As illustrated in FIG. 6 of the disclosure, the second clutch can 568 is substantially cylindrical in shape.

Integrally connected the outer surface 572 of the second clutch can 568 is a fourth plurality of clutch plates 574 that are interleafed with the third plurality of clutch plates 566 extending from the inner surface 552 of the second clutch drum 546. The fourth plurality of clutch plates 574 are integrally connected to the outer surface 572 of the second clutch can 568 and individually fitted to allow sliding movement in the axial direction along the outer surface 572 of the second clutch can 568.

According to the embodiment of the disclosure illustrated in FIG. 6 and as a non-limiting example, at least a portion of the ring gear 488 separates the first and second plurality of clutch plates 514 and 522 from the third and fourth plurality of clutch plates 566 and 574. It is within the scope of this disclosure and as a non-limiting example, that the first side 492 of the ring gear 488 may serve as a reaction member or pressure plate for the first and second plurality of clutch plates 514 and 522. Additionally, it is within the scope of this disclosure and as a non-limiting example, that the second side 494 of the ring gear 488 may serve as a reaction member or pressure plate for the third and fourth plurality of clutch plates 566 and 574.

Extending co-axially with the reduced diameter portion 558 and the larger diameter portion 562 of the second clutch drum 546 is a second shaft 576 having a first end portion 578, a second end portion 580 and an outer surface 582. As a non-limiting example, the second shaft 576 is a stub shaft, a coupling shaft and/or a first axle half shaft. Integrally connected to at least a portion of the second end portion 580 of the second shaft 576 is a second axle half shaft (not shown) and/or a second wheel assembly (not shown).

Drivingly connecting the second clutch can 568 to the first shaft 524 is a radially extending portion 584 having a first end portion 586 and a second end portion 588. At least a portion of the first end portion 586 of the radially extending portion 584 is integrally connected to at least a portion of the inner surface 570 of the second clutch can 568. As a non-limiting example the first end portion 586 of the radially extending portion 584 is integrally connected to the second clutch can 568 by using one or more welds and/or one or more mechanical fasteners. Additionally, as a non-limiting example, the first end portion 586 of the radially extending portion 584 may be integrally formed as part of the second clutch can 568. The radially extending portion 584 extends radially inward from the second clutch can 568 to the second shaft 576. At least a portion of the second end portion 588 of the radially extending portion 584 is integrally connected to at least a portion of the outer surface 582 of the first end portion 578 of the second shaft 576. As a non-limiting example, the second end portion 588 of the radially extending portion 584 is integrally connected to the first end portion 578 of the second shaft 576 by using one or more welds, one or more mechanical fasteners, one or more snap rings and/or a splined connection. Additionally, as a non-limiting example, the second end portion 588 of the radially extending portion 584 may be integrally formed as part of the second shaft 576.

One or more second thrust pins 590 extend through one or more second thrust pin openings 591 extending from the inner surface 552 to the outer surface 554 of the radially extending wall 560 of the second clutch drum 546. At least a portion of the first end portion 594 of the one or more second thrust pins 590 extends within the hollow portion 556 of the second clutch drum 546 and at least a portion of a second end portion 592 of the one or more second thrust pins 590 extends outside the second clutch drum 546. Additionally, at least a portion of the first end portion 592 of the one or more second thrust pins 590 is in direct contact with the third plurality of clutch plates 566 or the fourth plurality of clutch plates 574.

Disposed axially outboard from the second end portion 594 of the one or more second thrust pins 590 is a second thrust bearing 596. The second thrust bearing 596 allows at least a portion of a second clutch actuation mechanism 597 to rotate relative to the one or more second thrust pins 590. As a non-limiting example, the second clutch actuation mechanism 597 may be a ball and ramp assembly and/or an actuator. In operation, an amount of force is applied onto an end of the second thrust bearing 596, opposite the one or more second thrust pins 590, until the one or more second thrust pins 590 come into direct contact with the third and/or fourth plurality of clutch plates 566 and/or 574. This allows the third and the fourth plurality of clutch plates 566 and 574 to be at least variably frictionally engaged thereby allowing a variable amount of rotational energy or torque to be transferred to the second wheel assembly (not shown).

According to the embodiment of the disclosure where the second clutch actuation mechanism 597 is a ball and ramp assembly, the ball and ramp assembly includes a pressure plate, an actuator plate and one or more balls that are disposed between the pressure plate and the actuator plate. It is within the scope of this disclosure that the actuator plate and the pressure plate may be either rotating or non-rotating. Additionally, at least a portion of the one or more balls are disposed within one or more grooves on a side of the pressure plate and within one or more grooves on a side of the actuator plate. As the actuator plate and/or the pressure plate is rotated, the actuator plate is translated axially toward the second thrust bearing 596 until the second thrust bearing 596 is in direct contact with the one or more second thrust pins 590. That force then translates the one or more second thrust pins 590 axially toward the third and fourth plurality of clutch plates 566 and 574 thereby applying an amount of force onto and causing the third and the fourth plurality of clutch plates 566 and 574 to be at least variably frictionally engaged.

Figure 7:
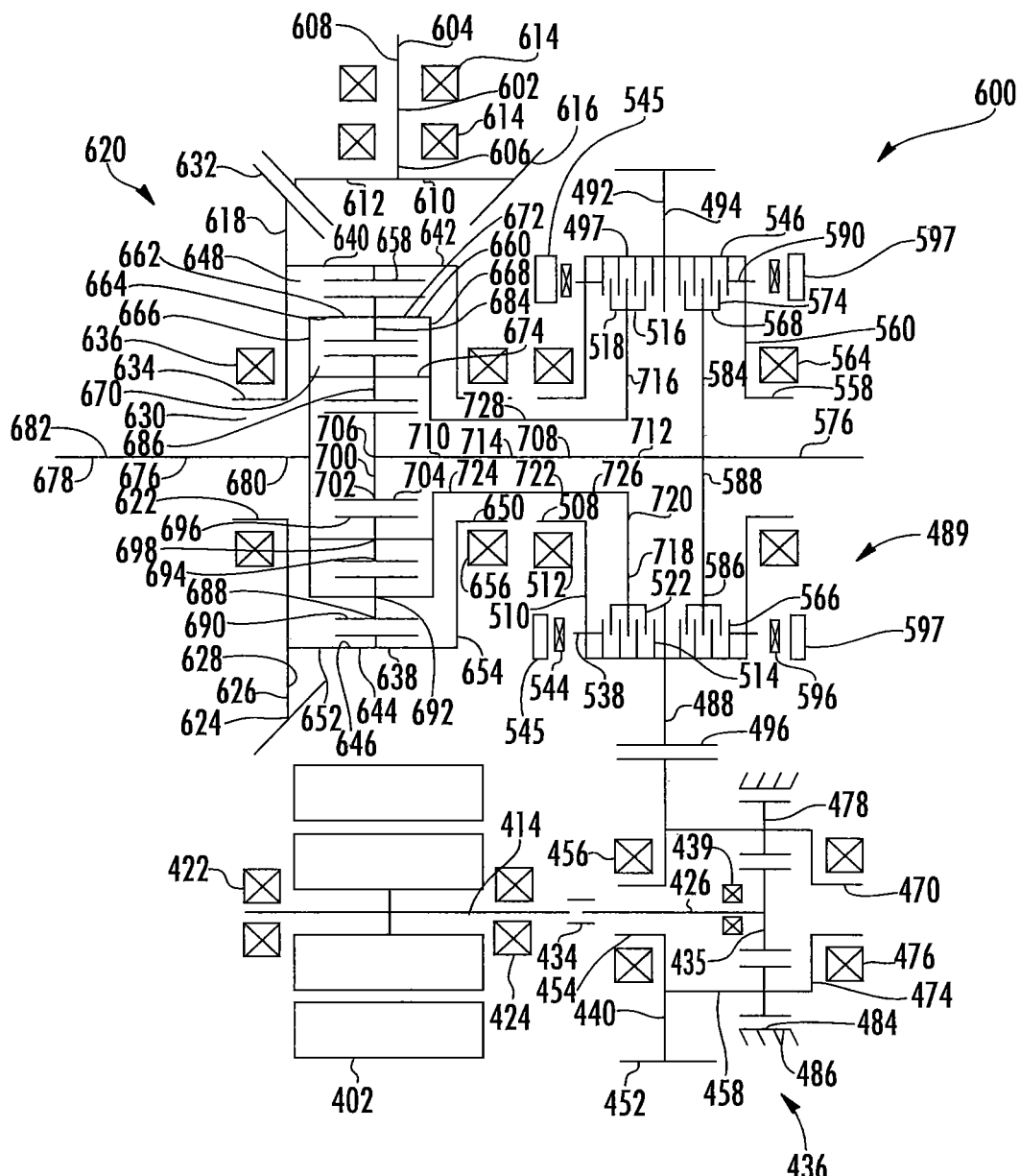
FIG. 7 is a schematic illustration of a drive unit assembly according to an alternative embodiment of the disclosure.

FIG. 7 is a schematic illustration of a drive unit assembly 600 according to an alternative embodiment of the disclosure. The drive unit assembly 600 illustrated in FIG. 7 is the same as the drive unit assembly 400 illustrated in FIG. 6, except where specifically noted below. According to this embodiment of the disclosure and as a non-limiting example, the drive unit assembly 600 may be a forward drive unit and/or a rear drive unit for a hybrid vehicle and/or an electric drive vehicle. The drive unit assembly 600 includes an input shaft 602 having a first end portion 604, second end portion 606 and an outer surface 608. As a non-limiting example, the input shaft 602 is a differential input shaft, a stub shaft, a coupling shaft or a pinion shaft.

Integrally connected to the second end portion 606 of the input shaft 602 is a pinion gear 610 having an outer surface 612. As a non-limiting example, the pinion gear 610 may be integrally connected to the second end portion 606 of the input shaft 602 by a spline connection, one or more welds and/or one or more mechanical fasteners. Additionally, as a non-limiting example, the pinion gear 610 may be integrally formed as part of the second end portion 606 of the input shaft 602.

In direct contact with at least a portion of the outer surface 608 of the input shaft 602 is one or more input shaft bearings 614. As illustrated in FIG. 7 of the disclosure, the one or more input shaft bearings 614 are adjacent to the pinion gear 610. The one or more input shaft bearings 614 provide rotational support and/or axial load support for the input shaft 602 when in operation.

Circumferentially extending from at least a portion of the outer surface 610 of the pinion gear is a plurality of gear teeth 616. As a non-limiting example, the plurality of gear teeth 616 on the outer surface 610 of the pinion gear 610 are a plurality of hypoid gear teeth, spiral bevel gear teeth, helical gear teeth, spur gear teeth, double hypoid gear teeth, double spiral bevel gear teeth or double helical gear teeth.

Meshingly engaged with the pinion gear 610 is a differential ring gear 618 of a planetary differential assembly 620. As illustrated in FIG. 7 of the disclosure, the differential ring gear 618 has an inner surface 622, an outer surface 624, a first side 626 and a second side 628. The inner surface 622 and the outer surface 624 defines a hollow portion 630 therein. Circumferentially extending from at least a portion of the outer surface 624 of the differential ring gear 618 is a plurality of gear teeth 632 that are complementary to and meshingly engaged with the plurality of gear teeth 616 on the outer surface 612 of the pinion gear 610. As a non-limiting example, the plurality of gear teeth 632 on the outer surface 624 of the differential ring gear 618 are a plurality of hypoid gear teeth, spiral bevel gear teeth, helical gear teeth, spur gear teeth, double hypoid gear teeth, double spiral bevel gear teeth or double helical gear teeth.

Extending axially outboard from the first side 626 of the differential ring gear 618 is a protruding portion 634. Disposed axially outboard from and adjacent to the protruding portion 634 of the differential ring gear 618 is a ring gear bearing 636. The ring gear bearing 636 provides rotational support and/or axial load support for the differential ring gear 618 and/or the planetary differential assembly 620 when in operation.

A differential case 638 extends axially outboard from the second side 628 of the differential ring gear 618 away from the protruding portion 634. As illustrated in FIG. 7 of the disclosure, the differential case 638 has a first end portion 640, a second end portion 642, an inner surface 644 and an outer surface 646. The inner surface 646 and the outer surface 644 of the differential case 638 defines a hollow portion 648 therein.

At least a portion of the second end portion 642 of the differential case 638 has a reduced diameter portion 650. Integrally connecting the reduced diameter portion 650 to the larger diameter portion 652 of the differential case 638 is a radially extending wall 654. Disposed radially outboard from and adjacent to the outer surface of the outer surface 644 of the reduced diameter portion 650 is a differential case bearing 656. The differential case bearing 565 provides rotational support and/or axial load support for the differential case 638 and/or the planetary differential assembly 620 when in operation.

Circumferentially extending from at least a portion of the inner surface 646 of the differential case 638 is a plurality of gear teeth 658. As a non-limiting example, the plurality of gear teeth 658 on the inner surface 646 of the differential case 638 are a plurality of hypoid gear teeth, spiral bevel gear teeth, helical gear teeth, spur gear teeth, double hypoid gear teeth, double spiral bevel gear teeth or double helical gear teeth.

Disposed within the differential case 638 is the planet carrier 660 having an inner surface 662, an outer surface 664, a first side 666 and a second side 668. The inner surface 662 and the outer surface 664 of the planet carrier 660 defines a hollow portion 670 therein. As illustrated in FIG. 7 of the disclosure, the planet carrier 660 extends co-axially with the differential case 638. Additionally, the planet carrier 660 includes one or more outer planetary gear shafts 672 and one or more inner planetary gear shafts 674 that extend from the first side 666 of the differential case 638 to the second side 668 of the differential case 638. The one or more outer planetary gear shafts 672 is substantially parallel to the one or more inner planetary gear shafts 674 and the differential case 638.

Integrally connected to the first side 666 of the planet carrier 660 is a first shaft 676 having a first end portion 678, a second end portion 680 and an outer surface 682. The first shaft extends co-axially with the reduced diameter portion 634 of the differential ring gear 618, the differential case 638 and the planet carrier 660. As a non-limiting example, the first shaft 676 is a stub shaft, a coupling shaft and/or a first axle half shaft. Integrally connected to at least a portion of the first end portion 678 of the first shaft 676 is a first axle half shaft (not shown) and/or a first wheel assembly (not shown). At least a portion of the second end portion 680 of the first shaft 676 is integrally connected to the first side 666 of the planet carrier 660. As a non-limiting example the second end portion 680 of the first shaft 676 is integrally connected to the first side 666 of the planet carrier by using a spline connection, one or more welds and/or one or more mechanical fasteners. Additionally, as a non-limiting example, the second end portion 680 of the first shaft 676 may be integrally formed as part of the first side 666 of the planet carrier 660.

The planetary differential assembly 620 includes one or more outer planetary gears 684 and one or more inner planetary gears 686. The one or more outer planetary gears 684 and one or more inner planetary gears 686 are disposed radially inboard from and are at least partially radially aligned with the plurality gear teeth 658 on the inner surface 646 of the planet carrier 660. Circumferentially extending from an outer surface 688 of the one or more outer planetary gears 684 is a plurality of gear teeth 690 that are complementary to and meshingly engaged with the plurality of gear teeth 658 on the inner surface 646 of the planet carrier 660. As a non-limiting example, the plurality of gear teeth 690 on the outer surface 688 of the one or more outer planetary gears 684 are a plurality of hypoid gear teeth, spiral bevel gear teeth, helical gear teeth, spur gear teeth, double hypoid gear teeth, double spiral bevel gear teeth or double helical gear teeth. Additionally, at least a portion of an inner surface 692 of the one or more outer planetary gears 684 are rotatively and drivingly connected to at least a portion of the one or more outer planetary gear shafts 672 of the planet carrier 660.

The one or more inner planetary gears 686 are disposed radially inboard from and at least partially radially aligned with the one or more outer planetary gears 684. Circumferentially extending from at least a portion of an outer surface 694 of the one or more inner planetary gears 686 is a plurality of gear teeth 696 that are complementary to and meshingly engaged with the plurality of gear teeth 690 on the outer surface 688 of the one or more outer planetary gears 684. As a non-limiting example, the plurality of gear teeth 696 on the outer surface 694 of the one or more inner planetary gears 686 are a plurality of hypoid gear teeth, spiral bevel gear teeth, helical gear teeth, spur gear teeth, double hypoid gear teeth, double spiral bevel gear teeth or double helical gear teeth. Additionally, at least a portion of an inner surface 698 of the one or more inner planetary gears 686 are rotatively and drivingly connected to at least a portion of the one or more inner planetary gear shafts 674 of the planet carrier 660.

Disposed radially inboard from the plurality of gear teeth 658 on the inner surface 646 of the planet carrier 660, the one or more outer planetary gears 684 and one or more inner planetary gears 686 is the sun gear 700. Additionally, the sun gear 700 extends co-axially with the one or more outer planetary gears 684, the one or more inner planetary gears 686, the one or more outer planetary gear shafts 672 and the one or more inner planetary gear shafts 674. Circumferentially extending from at least a portion of an outer surface 702 of the sun gear 700 is a plurality of gear teeth 704 that are complementary to and meshingly engaged with the plurality of gear teeth 696 on the outer surface 694 of the one or more inner planetary gears 686. As a non-limiting example, the plurality of gear teeth 704 on the outer surface 602 of the sun gear 700 are a plurality of hypoid gear teeth, spiral bevel gear teeth, helical gear teeth, spur gear teeth, double hypoid gear teeth, double spiral bevel gear teeth or double helical gear teeth.

Integrally connected to an inner surface 706 of the sun gear 700 is a sun gear input shaft 708 having a first end portion 710, a second end portion 712 and an outer surface 714. The sun gear input shaft 708 extends co-axially with the sun gear 700. As a non-limiting example, the first end portion 710 of the sun gear input shaft 708 may be integrally connected to the inner surface 706 of the sun gear 700 by using one or more welds, one or more mechanical fasteners, one or more snap rings and/or a splined connection. Additionally, as a non-limiting example, the sun gear 700 may be integrally formed as part of the first end portion 710 of the sun gear input shaft 708.

As illustrated in FIG. 7 of the disclosure, the sun gear input shaft 708 extends axially outboard from the sun gear 700 toward the radially extending portion 584 of the second clutch can 568 drivingly connecting the second clutch can 568 with the sun gear 700. At least a portion of the second end portion 712 of the sun gear input shaft 708 is integrally connected to a side of the radially extending portion 584 of the second clutch can 568 opposite the second shaft 576. As a non-limiting example, the second end portion 712 of the sun gear input shaft 708 may be integrally connected to the side of the radially extending portion 584 of the second clutch can 568 opposite the second shaft 576 by using one or more welds, one or more mechanical fasteners, one or more snap rings and/or a splined connection. Additionally, as a non-limiting example, the second end portion 712 of the sun gear input shaft 708 may be integrally formed as part of the side of the radially extending portion 584 of the second clutch can 568.

Integrally connected to at least a portion of the inner surface 518 of the first clutch can 516 is a radially extending portion 716 having a first end portion 718 and a second end portion 720. As illustrated in FIG. 7 of the disclosure, the radially extending portion 716 extends radially inward from the inner surface 518 of the first clutch can 516 toward the sun gear input shaft 708. At least a portion of the first end portion 718 is integrally connected to at least a portion of the inner surface 518 of the first clutch can 516 of the clutching assembly or torque vectoring assembly 489. As a non-limiting example, the first end portion 718 of the radially extending portion 716 may be integrally connected to the inner surface 518 of the first clutch can 516 by using one or more welds and/or one or more mechanical fasteners. Additionally, as a non-limiting example, the first end portion 718 of the radially extending portion 716 may be integrally formed as part of the first clutch can 516.

Drivingly connecting the first clutch can 516 to the planet carrier 660 is an axially extending portion 722 having a first end portion 724, a second end portion 726 and an outer surface 728. The axially extending portion 722 is disposed radially outboard from and extends co-axially with the sun gear input shaft 708. As illustrated in FIG. 7 of the disclosure and a non-limiting example, the axially extending portion 722 is substantially cylindrical in shape. At least a portion of the first end portion 724 of the axially extending portion 722 is integrally connected to at least a portion of the second side 668 of the planet carrier 660. As a non-limiting example, the first end portion 724 of the axially extending portion 722 may be integrally connected to the second side 668 of the planet carrier 660 by using one or more welds and/or one or more mechanical fasteners. Additionally, as a non-limiting example, the first end portion 724 of the axially extending portion 722 may be integrally formed as part of the second side 668 of the planet carrier 660.

At least a portion of the second end portion 726 of the axially extending portion 722 is integrally connected to at least a portion of the second end portion 720 of the radially extending portion 716. As a non-limiting example, the second end portion 726 of the axially extending portion 722 may be integrally connected to the second end portion 720 of radially extending portion 716 by using one or more welds and/or one or more mechanical fasteners. Additionally, as a non-limiting example, the second end portion 726 of the axially extending portion 722 may be integrally formed as part of the second end portion 720 of the axially extending portion 722.

When in operation, an amount of force is applied onto an end of the first thrust bearing 544, opposite the one or more first thrust pins 538, by the first clutch actuation mechanism 545 thereby causing the first plurality of clutch plates 514 to be at least variably frictionally engaged with the second plurality of plates 522. Additionally, when in operation, an amount of force may be applied onto an end of the second thrust bearing 596, opposite the one or more second thrust pins 590, by the second clutch actuation mechanism 597 thereby causing the third plurality of clutch plates 566 to be at least variably frictionally engaged with the fourth plurality of clutch plates 574. This allows a variable amount of rotational energy or torque to be transferred to the first wheel assembly (not shown) and/or the second wheel assembly (not shown).

Figure 8:
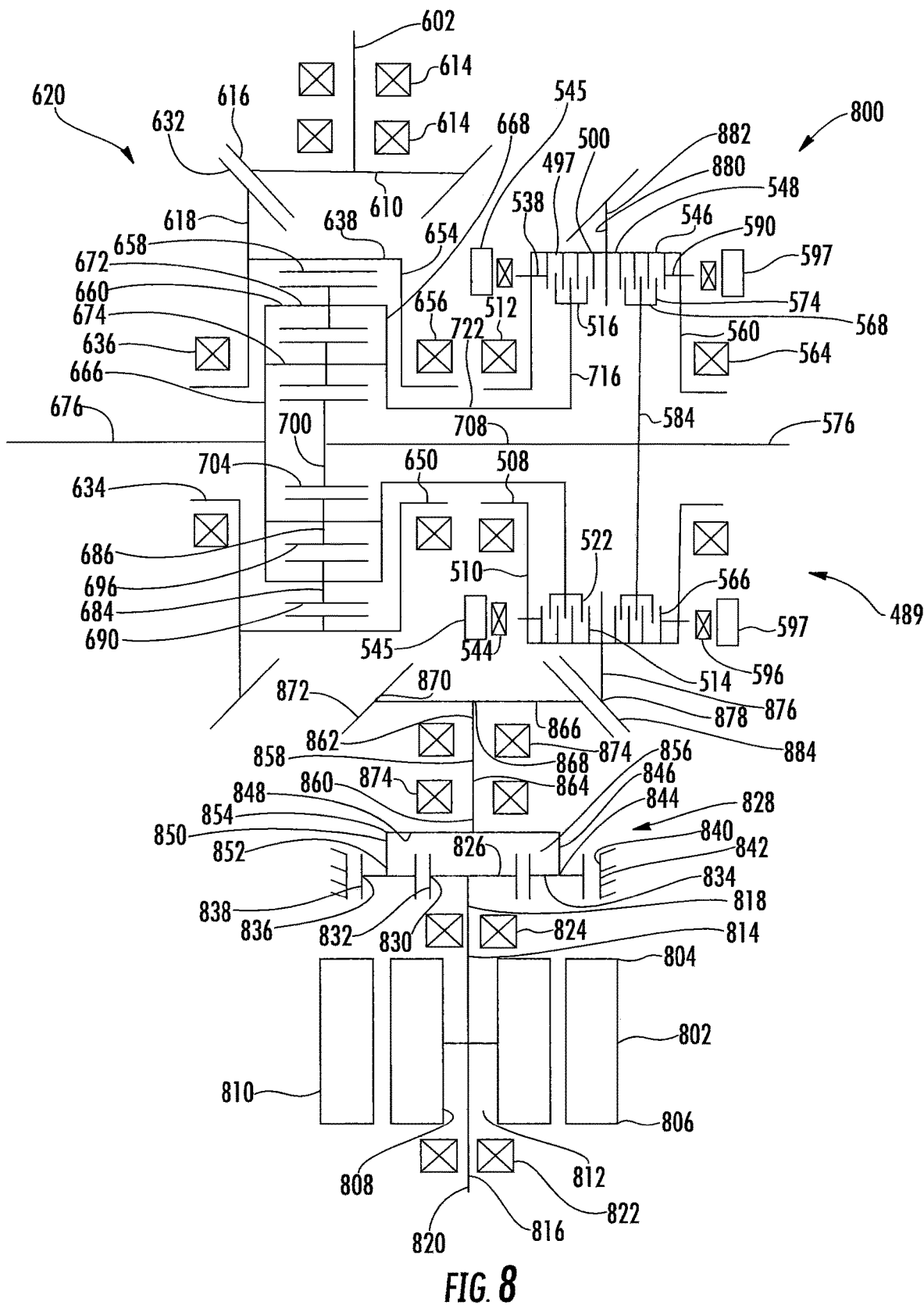
FIG. 8 is a schematic illustration of a drive unit assembly according to another embodiment of the disclosure.

FIG. 8 is a schematic illustration of a drive unit assembly 800 according to another embodiment of the disclosure. The drive unit assembly 800 illustrated in FIG. 8 is the same as the drive unit assembly 600 illustrated in FIG. 7, except where specifically noted below. In accordance with this embodiment of the disclosure the drive unit assembly 800 includes and electric motor 802 having a first end 804, a second end 806, an inner surface 808 and an outer surface 810. The inner surface 808 and the outer surface 810 of the electric motor 802 defines a hollow portion 812 therein. As a non-limiting example, the drive unit assembly 800 may be a forward drive unit and/or a rear drive unit for a hybrid vehicle and/or an electric drive vehicle.

Extending co-axially with the electric motor 802 is an electric motor spindle or an electric motor output shaft 814 having a first end portion 816, second end portion 818 and an outer surface 820. At least a portion of the inner surface 808 of the electric motor 802 is drivingly connected to the outer surface 820 of the electric motor spindle or electric motor output shaft 814.

The electric motor spindle or electric motor output shaft 814 is rotationally supported by a first electric motor spindle or electric motor output shaft bearing 822 and/or a second electric motor spindle or electric motor output shaft bearing 824. The first electric motor spindle or electric motor output shaft bearing 822 is co-axial with the electric motor spindle or electric motor output shaft 814 and is disposed axially outboard from and is adjacent to the second end 806 of the electric motor 802. Additionally, at least a portion of the first electric motor spindle or electric motor output shaft bearing 822 is in direct contact with at least a portion of the outer surface 820 of the electric motor spindle or electric motor output shaft 814.

The second electric motor spindle or electric motor output shaft bearing 824 is co-axial with the electric motor spindle or electric motor output shaft 814 and is disposed axially outboard from and is adjacent to the first end 804 of the electric motor 802. At least a portion of the second electric motor spindle or electric motor output shaft bearing 824 is in direct contact with at least a portion of the outer surface 820 of the electric motor spindle or electric motor output shaft 814.

Drivingly connected to at least a portion of the second end portion 818 of the electric motor spindle or electric motor output shaft 814 is a sun gear 826 of the planetary gear assembly 828. The sun gear 826 of the planetary gear assembly 828 is co-axial with the electric motor spindle or electric motor output shaft 814. Circumferentially extending from at least a portion of an outer surface 830 of the sun gear 826 is a plurality of gear teeth 832. As a non-limiting example, the plurality of gear teeth 832 on the outer surface 830 of the sun gear 826 are a plurality of hypoid gear teeth, spiral bevel gear teeth, helical gear teeth, spur gear teeth, double hypoid gear teeth, double spiral bevel gear teeth or double helical gear teeth.

According to an embodiment of the disclosure (not shown), the sun gear is spliningly engaged with at least a portion of the outer surface of the second end portion of the electric motor spindle or electric motor output shaft. In accordance with this embodiment of the disclosure (not shown), a plurality of splines circumferentially extend from at least a portion of the outer surface of the second end portion of the electric motor spindle or electric motor output shaft. Additionally, in accordance with this embodiment of the disclosure (not shown), the sun gear has an inner surface and an outer surface defining a hollow portion therein. Circumferentially extending from at least a portion of the inner surface of the sun gear is a plurality of splines that are complementary to and meshingly engaged with the plurality of splines on the outer surface of the second end portion of the electric motor spindle or electric motor output shaft.

According to an alternative embodiment of the disclosure (not shown), the sun gear may be integrally connected to at least a portion of the outer surface of the second end portion of the electric motor spindle or electric motor output shaft by using one or more welds and/or one or more mechanical fasteners.

In accordance with yet another alternative embodiment of the disclosure, the sun gear 826 may be integrally formed as part of the second end portion 818 of the electric motor spindle or electric motor output shaft 814. In accordance with this embodiment of the disclosure, the sun gear 826 may be cast as part of the electric motor spindle or electric motor output shaft 814 or machined into the second end portion 818 of the electric motor spindle or electric motor output shaft 814.

Disposed axially outboard from the sun gear 826 is one or more planetary gears 834. Circumferentially extending from an outer surface 836 of the one or more planetary gears 834 is a plurality of gear teeth 838 that are complementary to and meshingly engaged with the plurality of gear teeth 832 on the outer surface 830 of the sun gear 826. As a non-limiting example, the plurality of gear teeth 838 on the outer surface 836 of the one or more planetary gears 834 are a plurality of hypoid gear teeth, spiral bevel gear teeth, helical gear teeth, spur gear teeth, double hypoid gear teeth, double spiral bevel gear teeth or double helical gear teeth.

Additionally, the plurality of gear teeth 838 on the outer surface 836 of the one or more planetary gears 834 are meshingly engaged with a complementary plurality of gear teeth 840 circumferentially extending from an inner surface of a housing 842. The plurality of gear teeth 840 on the inner surface of the housing 842 form a planetary ring gear. As a non-limiting example, the plurality of gear teeth 840 on the inner surface of the housing 842 are a plurality of hypoid gear teeth, spiral bevel gear teeth, helical gear teeth, spur gear teeth, double hypoid gear teeth, double spiral bevel gear teeth or double helical gear teeth.

Drivingly connected to an inner surface 844 of the one or more planetary gears 834 is a planetary gear housing or a planetary gear carrier 846 having an inner surface 848, an outer surface 850, a first end portion 852 and a second end portion 854. The inner surface 848 and the outer surface 850 of the planetary gear housing or planetary gear carrier 846 defines a hollow portion 856 therein. As illustrated in FIG. 8 of the disclosure, the planet carrier 848 extends radially outboard from the one or more planetary gears 834 in the opposite direction of the electric motor 802. At least a portion of the inner surface 844 of the one or more planetary gears 834 is drivingly and rotatively connected to at least a portion of the first end portion 852 of the planetary gear housing or planetary gear carrier 846. The inner surface 844 of the one or more planetary gears 834 may be rotatively and drivingly connected to at least a portion of the first end portion 852 of the planet carrier 848 by any conventional means.

A pinion gear input shaft 858 having a first end portion 860, a second end portion 862 and an outer surface 864 is located radially outboard from the second end portion 854 of the planetary gear housing or planetary gear carrier 846 of the planetary gear assembly 828. As illustrated in FIG. 8 of the disclosure, the first end portion 860 of the pinion gear input shaft 858 is drivingly connected to at least a portion of the second end portion 854 of the planetary gear housing or planetary gear carrier 846. As a non-limiting example, the first end portion 860 of the pinion gear input shaft 858 may be integrally connected to the second end portion 854 of the planetary gear housing or planetary gear carrier 846 by using one or more welds, one or more mechanical fasteners, one or more snap rings and/or a splined connection. Additionally, as a non-limiting example, the first end portion of the 860 of the pinion gear input shaft 858 may be integrally formed as part of the planetary gear housing or planetary gear carrier 846.

At least a portion of the second end portion 862 of the pinion gear input shaft 858 is drivingly connected to a pinion gear 866 having an inner surface 868 and an outer surface 870. As a non-limiting example, the second end portion 862 of the pinion gear input shaft 858 is drivingly connected to the inner surface 868 of the pinion gear 866 by using one or more welds, one or more mechanical fasteners, on or more snap rings and/or a spline connection. Additionally, as a non-limiting example, the pinion gear 866 may be integrally formed as part of the second end portion 862 of the pinion gear input shaft 858.

Circumferentially extending from at least a portion of the outer surface 870 of the pinion gear 866 is a plurality of gear teeth 872. As a non-limiting example, the plurality of gear teeth 872 on the outer surface of the pinion gear 866 are a plurality of hypoid gear teeth, spiral bevel gear teeth, helical gear teeth, spur gear teeth, double hypoid gear teeth, double spiral bevel gear teeth or double helical gear teeth.

Disposed radially outboard from the pinion gear input shaft 858 is one or more pinion gear input shaft bearings 874. As illustrated in FIG. 8 of the disclosure, the one or more pinion gear input shaft bearings 874 are located between the pinion gear 866 and the planetary gear housing or planetary gear carrier 846 of the planetary gear assembly 828. The one or more pinion gear input shaft bearings 874 provide rotational support for the pinion gear input shaft 858. Additionally, the one or more pinion gear input shaft bearings 874 may also provide axial load support for the planetary gear housing or planetary gear carrier 846 and/or the pinion gear 866.

Axially outboard from the pinion gear 866 is a clutching assembly ring gear 876 having an outer surface 878, a first side 880 and a second side 882. The clutching assembly ring gear 876 drivingly connects the electric motor 802 to the clutching assembly or torque vectoring assembly 489. Circumferentially extending from at least a portion of the outer surface 878 of the clutching assembly ring gear 876 is a plurality of gear teeth 884 that are complementary to and meshingly engaged with the plurality of gear teeth 872 on the outer surface 870 of the pinion gear 866. As a non-limiting example the plurality of gear teeth 884 on the outer surface 870 of the clutching assembly ring gear 876 are a plurality of hypoid gear teeth, spiral bevel gear teeth, helical gear teeth, spur gear teeth, double hypoid gear teeth, double spiral bevel gear teeth or double helical gear teeth.

As illustrated in FIG. 8 of the disclosure, the first side 880 of the clutching assembly ring gear 876 is integrally connected to at least a portion of the second end portion 500 of the first clutch drum 497 and the second side 880 of the clutching assembly ring gear 876 is integrally connected to the first end portion 548 of the second clutch drum 546. As a non-limiting example, the second end portion 500 of the first clutch drum 497 and the first end portion 548 of the second clutch drum 546 may be integrally connected to the clutching assembly ring gear 876 by using one or more welds and/or one or more mechanical fasteners. Additionally, as a non-limiting example, the second end portion 500 of the first clutch drum 497 may integrally formed as part of the first side 880 of the clutching assembly ring gear 876 and the first end portion 548 of the second clutch drum 546 may be integrally formed as part of the second side 882 of the clutching assembly ring gear 876.

According to the embodiment of the disclosure illustrated in FIG. 8 and as a non-limiting example, at least a portion of the ring gear 876 separates the first and second plurality of clutch plates 514 and 522 from the third and fourth plurality of clutch plates 566 and 574. It is within the scope of this disclosure and as a non-limiting example, that the first side 880 of the ring gear 876 may serve as a reaction member or pressure plate for the first and second plurality of clutch plates 514 and 522. Additionally, it is within the scope of this disclosure and as a non-limiting example, that the second side 882 of the ring gear 876 may serve as a reaction member or pressure plate for the third and fourth plurality of clutch plates 566 and 574.

Figure 9:
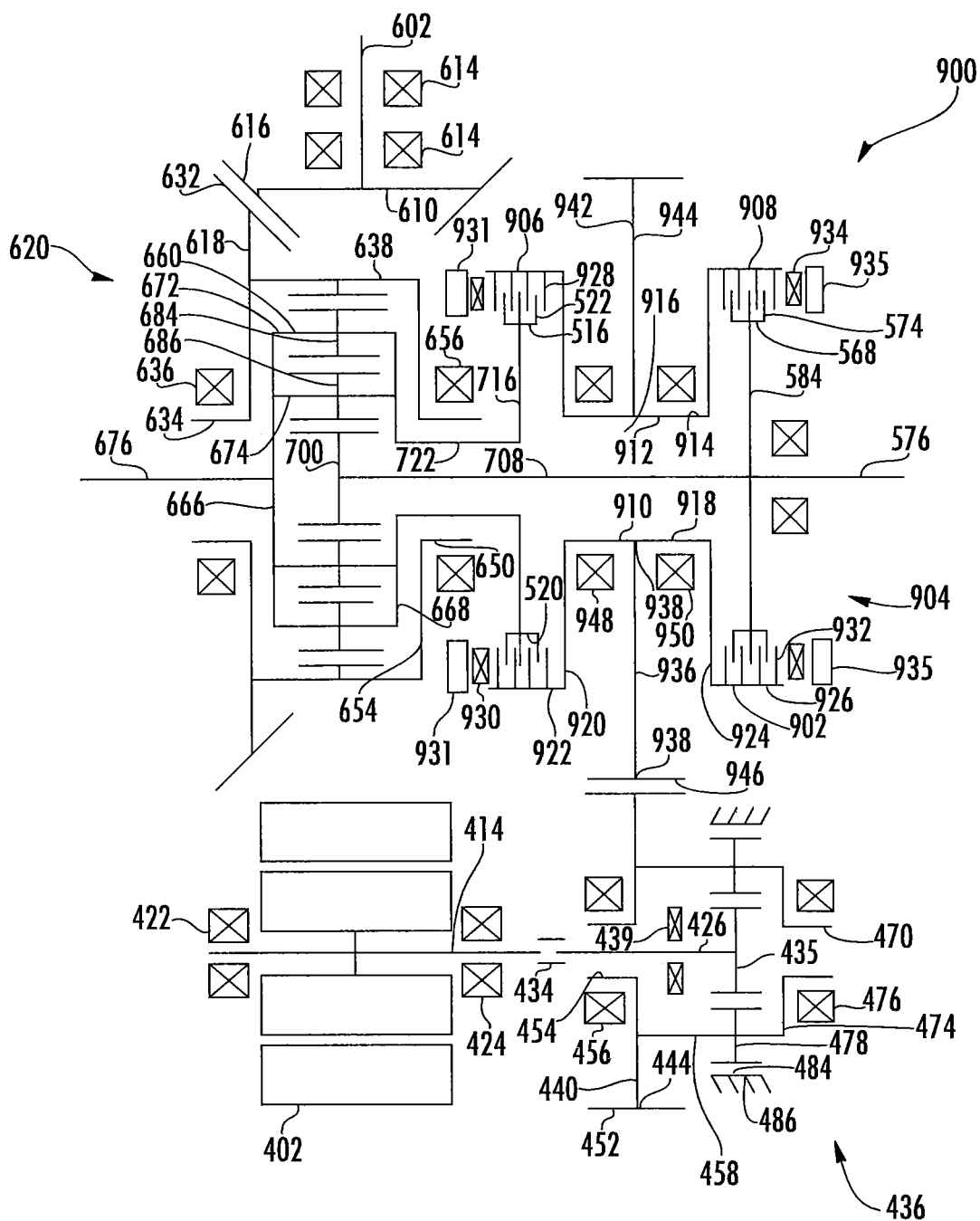
FIG. 9 is a schematic illustration of a drive unit assembly according to yet another embodiment of the disclosure.

FIG. 9 is a schematic illustration of a drive unit assembly 900 according to yet another embodiment of the disclosure. The drive unit assembly 900 illustrated in FIG. 9 is the same as the drive unit assemblies 400 and 600 illustrated in FIGS. 6 and 7, except where specifically noted below. Disposed axially outboard from the planetary differential assembly 620 is a clutch drum 902 of a clutching assembly or torque vectoring assembly 904. As illustrated in FIG. 9 of the disclosure, the clutch drum 902 has a first end portion 906, a second end portion 908, an intermediate portion 910, an inner surface 912 and an outer surface 914. The inner surface 912 and the outer surface 914 of the clutch drum 902 defines a hollow portion 916 therein. At least a portion of the first clutch can 516 and the second clutch can 568 is disposed within the clutch drum 902. Additionally, the clutch drum 902 extends co-axially with the sun gear input shaft 708.

At least a portion of the intermediate portion 910 of the clutch drum 902 includes a reduced diameter portion 918. As illustrated in FIG. 9 of the disclosure the intermediate portion 918 of the clutch drum 902 is substantially cylindrical in shape and extends co-axially with the sun gear input shaft 708. A first radially extending wall 920 extends radially outboard from the reduced diameter portion 918 of the clutch drum 902 to the first larger diameter portion 922 of the first end portion 906 of the clutch drum 902 thereby connecting the reduced diameter portion 918 to the first larger diameter portion 922. Additionally, a second radially extending wall 924 extends radially outboard from the reduced diameter portion 918 of the clutch drum 902 to the second larger diameter portion 926 of the second end portion 908 of the clutch drum 902 thereby connecting the reduced diameter portion 918 to the second larger diameter portion 926.

Integrally connected to the inner surface 912 of the first larger diameter portion 922 of first end portion 906 of the clutch drum 902 is a first plurality of clutch plates 928. The first plurality of clutch plates 928 are integrally connected to the inner surface 912 of the first larger diameter portion 922 of the clutch drum 902 and individually fitted to allow sliding movement in the axial direction along the inner surface 912 of the first larger diameter portion 922 of the first end portion 906 of the clutch drum 902. As illustrated in FIG. 9 of the disclosure, the first plurality of clutch plates 928 are interleafed with the second plurality of clutch plates 522 attached to the outer surface 520 of the first clutch can 516.

Disposed axially outboard from the first and the second plurality of clutch plates 928 and 522 is a first thrust bearing 930. The first thrust bearing 930 allows at least a portion of a first clutch actuation mechanism 931 to rotate relative to the first and the second plurality of clutch plates 928 and 522. Additionally, the first thrust bearing 930 reduces the amount of friction between the first clutch actuation mechanism 931 and the first plurality of clutch plates 928 or the second plurality of clutch plates 522 when in operation. As a non-limiting example, the first clutch actuation mechanism 931 may be a ball and ramp assembly and/or an actuator. When in operation, an amount of force is applied onto an end of the first thrust bearing 930, opposite the first and the second plurality of clutch plates 928 and 522, until the first thrust bearing 930 comes into direct contact with the first or the second plurality of clutch plates 928 or 522. This allows the first and the second plurality of clutch plates 928 and 522 to be at least variably frictionally engaged thereby allowing a variable amount of rotational energy or torque to be transferred to the first wheel assembly (not shown).

According to the embodiment of the disclosure where the first clutch actuation mechanism 931 is a ball and ramp assembly, the ball and ramp assembly includes a pressure plate, an actuator plate and one or more balls that are disposed between the pressure plate and the actuator plate. It is within the scope of this disclosure that the actuator plate and the pressure plate may be rotating or non-rotating.

Additionally, at least a portion of the one or more balls are disposed within one or more grooves on a side of the pressure plate and within one or more grooves on a side of the actuator plate. As the actuator plate and/or the pressure plate is rotated, the actuator plate is translated axially toward the first thrust bearing 930 applying an amount of force directly to the first or the second plurality of clutch plates 928 or 522 thereby variably frictionally engaging the first plurality of clutch plates 928 with the second plurality of plates 522.

Integrally connected to the inner surface 912 of the second larger diameter portion 926 of second end portion 908 of the clutch drum 902 is a third plurality of clutch plates 932. The third plurality of clutch plates 932 are integrally connected to the inner surface 912 of the second larger diameter portion 926 of the clutch drum 902 and individually fitted to allow sliding movement in the axial direction along the inner surface 912 of the second larger diameter portion 926 of the second end portion 908 of the clutch drum 902. As illustrated in FIG. 9 of the disclosure, the third plurality of clutch plates 932 are interleafed with the fourth plurality of clutch plates 574 attached to the outer surface 572 of the second clutch can 568.

Disposed axially outboard from the third and the fourth plurality of clutch plates 932 and 574 is a second thrust bearing 934. The second thrust bearing 934 allows a second clutch actuation mechanism 935 to rotate relative to the third and the fourth plurality of clutch plates 932 and 574. Additionally, the second thrust bearing 934 reduces the amount of friction between the second clutch actuation mechanism 935 and the third or fourth plurality of clutch plates 932 or 574 when in operation. As a non-limiting example, the second clutch actuation mechanism 935 may be a ball and ramp assembly and/or an actuator. When in operation, an amount of force is applied onto an end of the second thrust bearing 934, opposite the third and the fourth plurality of clutch plates 932 and 574, until the second thrust bearing 934 comes into direct contact with the third or the fourth plurality of clutch plates 932 or 574. This allows the third and the fourth plurality of clutch plates 932 and 574 to be at least variably frictionally engaged thereby allowing a variable amount of rotational energy or torque to be transferred to the second wheel assembly (not shown).

According to the embodiment of the disclosure where the second clutch actuation mechanism 935 is a ball and ramp assembly, the ball and ramp assembly includes a pressure plate, an actuator plate and one or more balls that are disposed between the pressure plate and the actuator plate. It is within the scope of this disclosure that the actuator plate and the pressure plate may be rotating or non-rotating. Additionally, at least a portion of the one or more balls are disposed within one or more grooves on a side of the pressure plate and within one or more grooves on a side of the actuator plate. As the actuator plate and/or the pressure plate is rotated, the actuator plate is translated axially toward the second thrust bearing 934 applying an amount of force directly to the third or the fourth plurality of clutch plates 932 or 574 thereby variably frictionally engaging the third plurality of clutch plates 932 with the fourth plurality of plates 574.

Disposed radially outboard from the planetary gear assembly pinion gear 440 and the reduced diameter portion 918 of the clutch drum 902 is a clutching assembly ring gear 936 having an inner surface 938, an outer surface 940, a first side 942 and a second side 944. The clutching assembly ring gear 936 extends co-axially with the clutch drum 902 and the sun gear input shaft 708. Circumferentially extending from at least a portion of the outer surface 938 of the clutching assembly ring gear 936 is a plurality of gear teeth 946 that are complementary to and meshingly engaged with the plurality of gear teeth 452 on the outer surface 444 of the planetary gear assembly pinion gear 440. As a non-limiting example, the plurality of clutch teeth 946 on the outer surface 938 of the clutching assembly ring gear 936 are a plurality of hypoid gear teeth, spiral bevel gear teeth, helical gear teeth, spur gear teeth, double hypoid gear teeth, double spiral bevel gear teeth or double helical gear teeth.

At least a portion of the inner surface 938 of the clutching assembly ring gear 936 is drivingly connected to at least a portion of the outer surface 914 of the reduced diameter portion 918 of the clutch drum 902. As a non-limiting example, the inner surface 938 of the clutching assembly ring gear 936 may be integrally connected to the outer surface 914 of the reduced diameter portion 918 by using one or more welds and/or one or more mechanical fasteners. Additionally, as a non-limiting example, the inner surface 938 of the clutching assembly ring gear 936 may be integrally formed as part of the intermediate portion 918 of the clutch drum 902.

According to an alternative embodiment of the disclosure (not shown), the clutch drum 902 is split into a first clutch drum and a second clutch drum. In accordance with this embodiment of the disclosure, the first clutch drum includes the first larger diameter portion, the first radially extending wall and at least a portion of the reduced diameter portion. The second clutch drum includes the second larger diameter portion, the second radially extending wall and at least a portion of the reduced diameter portion. According to this embodiment of the disclosure at least a portion of the reduced diameter portion of the first clutch drum is drivingly connected to the first side of the clutching assembly ring gear and at least a portion of the reduced diameter portion of the second clutch drum is drivingly connected to the second side of the clutching assembly ring gear. As a non-limiting example, the reduced diameter portion of the first clutch can is integrally connected to the first side of the clutching assembly ring gear and the reduced diameter portion of the second clutch drum is integrally connected to the second side of the clutching assembly ring gear by using one or more welds and/or one or more mechanical fasteners. Additionally, as a non-limiting example, the reduced diameter portion of the first clutch drum and the reduced diameter portion of the second clutch drum may be integrally formed as part of the clutching assembly ring gear.

Radially outboard from the outer surface 914 of the reduced diameter portion 918 of the clutch drum 902 is a first bearing 948 and a second bearing 950. As illustrated in FIG. 9 of the disclosure, the first bearing 948 is disposed axially outboard from the clutching assembly ring gear 936 between the first side 942 of the clutching assembly ring gear 936 and the first radially extending wall 920. The first bearing 948 provides rotational support for the clutch drum 902 and/or the clutching assembly ring gear 936. Additionally, the first bearing 948 provides axial load support for the clutch drum 902 and/or the clutching assembly ring gear 936.

The second bearing 950 is disposed axially outboard from the clutching assembly ring gear 936 between the second side 944 of the clutching assembly ring gear 936 and the second radially extending wall 924. The second bearing 950 provides rotational support for the clutch drum 902 and/or the clutching assembly ring gear 936. Additionally, the second bearing 950 provides axial load support for the clutch drum 902 and/or the clutching assembly ring gear 936.

Figure 10:
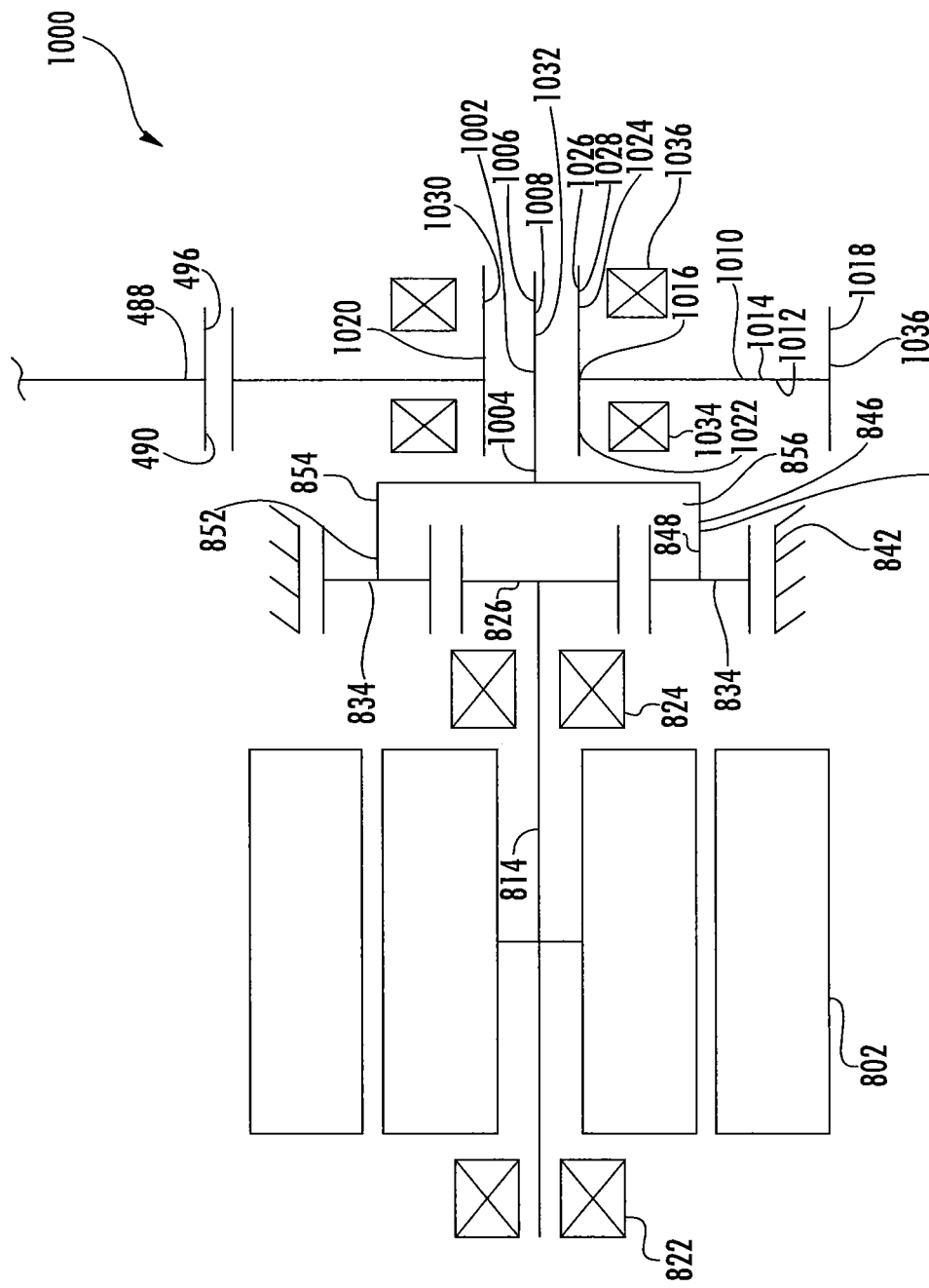
FIG. 10 is a schematic illustration of a portion of the drive unit assemblies illustrated in FIGS. 6-9 according to still yet another embodiment of the disclosure.

FIG. 10 is a schematic illustration of a portion of a drive unit 1000 according to still yet another embodiment of the disclosure. The portion of the drive unit 1000 illustrated in FIG. 10 is the same as the drive unit assemblies 400, 600, 800 and 900 illustrated in FIGS. 6-9, except where specifically noted below. Extending co-axially with the motor output shaft 814 of the electric motor 802 is a planetary gear output shaft 1002 having a first end portion 1004, a second end portion 1006 and an outer surface 1008. According to an embodiment of the disclosure and as a non-limiting example, at least a portion of the first end portion 1004 of the planetary gear output shaft 1002 is integrally formed as part of the second end portion 854 of the planetary gear housing or planetary gear carrier 846. In accordance with an alternative embodiment of the disclosure and as a non-limiting example, at least a portion of the first end portion 1004 of the planetary gear output shaft 1002 is integrally connected to at least a portion of the second end portion 854 of the planetary gear housing or planetary gear carrier 846 by using one or more welds, one or more mechanical fasteners, one or more adhesives and/or a threaded connection.

Drivingly connected to at least a portion of the planetary gear output shaft 1002 is a pinion gear 1010 having a first side 1012, a second side 1014, an inner surface 1016 and an outer surface 1018. Connected to at least a portion of the inner surface 1016 of the pinion gear 1010 is a substantially cylindrical portion 1020 having a first end portion 1022, a second end portion 1024, an inner surface 1026 and an outer surface 1028. According to an embodiment of the disclosure and as a non-limiting example, the substantially cylindrical portion 1020 of the pinion gear 1010 is integrally formed as part of the inner surface 1016 of the pinion gear 1010. In accordance with an alternative embodiment of the disclosure and as a non-limiting example, at least a portion of the outer surface 1028 of the substantially cylindrical portion 1020 is integrally connected to at least a portion of the inner surface 1016 of the pinion gear 1010 by using one or more welds, one or more mechanical fasteners, one or more adhesives and/or a threaded connection.

Circumferentially extending along at least a portion of the inner surface 1026 of the substantially cylindrical portion 1020 of the pinion gear 1010 is a plurality of axially extending pinion shaft splines 1030. The plurality of axially extending pinion shaft splines 1030 are complementary to and meshingly engaged with a plurality of axially extending planet carrier shaft splines 1032 extending along at least a portion of the outer surface 1008 of the planetary gear housing shaft 1002.

Rotationally supporting the pinion gear 1010 is a first pinion gear bearing 1034 and a second pinion gear bearing 1036. As illustrated in FIG. 10 of the disclosure, at least a portion of the first pinion gear bearing 1034 is disposed radially outboard from at least a portion of the first end portion 1022 of the substantially cylindrical portion 1020 and proximate to the first side 1012 of the pinion gear 1010. Additionally, as illustrated in FIG. 10 of the disclosure, at least a portion of the second pinion gear 1036 is disposed radially outboard from at least a portion of the second end portion 1024 of the substantially cylindrical portion 1020 and proximate to the second side 1014 of the pinion gear 1010. As a non-limiting example, the first and/or second pinion gears 1032 and/or 1034 is a tapered roller bearing, a roller bearing, a rolling element bearing and/or a bushing.

Circumferentially extending along at least a portion of the outer surface 1018 of the pinion gear 1010 is a plurality of gear teeth 1038. The plurality of gear teeth 1038 on the outer surface 1018 of the pinion gear 1010 are complementary to and meshingly engaged with the plurality of gear teeth 496 on the outer surface 490 of the ring gear 488 which in turn is connected to a clutching or torque vectoring assembly (not shown) described herein.

By incorporating the use of the drive units 400, 600, 800, 900 and/or 1000 into the vehicle (not shown), it enables the vehicle (not shown) to have increased fuel efficiency, increased battery life, increased battery charging capabilities, electric drive capabilities, power boost capabilities and a reduction in the overall emissions produced by the vehicle (not shown). In accordance with the embodiments of the disclosure, the drive units 400, 600, 800, 900 and/or 1000 allow the vehicle (not shown) to experience an electric drive mode. The electric drive mode is activated by putting the transmission (not shown) of the vehicle (not shown) into a neutral position and allowing the clutching assembly or torque vectoring assemblies 489 and 902 to apply an equal and/or variable amount of rotational energy or torque to the wheel assemblies (not shown). By varying the amount of rotational energy or torque to the wheels (not shown) of the vehicle (not shown), it allows the vehicle (not shown) to have improved handling and increased grip with the road (not shown) in all driving conditions.

Additionally, by incorporating the drive units 400, 600, 800, 900 and/or 1000 into the vehicle (not shown), it allows the vehicle (not shown) to have a power boost operating mode with or without an amount of torque vectoring. According to this embodiment of the disclosure, both the engine (not shown) of the vehicle (not shown) and the electric motors 402 and 802 of the drive units 400, 600, 800, 900 and/or 1000 are used to provide rotational energy or torque to the wheel assemblies (not shown). The vehicle (not shown) experiences a boost in rotational energy or torque by the additional rotational energy or torque that is provided by the electric motors 402 and 802 of the drive units 400, 600, 800, 900 and/or 1000. Additionally, the drive units 400, 600, 800, 900 and/or 1000 allow the wheels of the vehicle (not shown) to receive the same amount of rotational energy or torque with less rotational energy or torque being generated by the engine of the vehicle (not shown). This improves the overall fuel efficiency and reduces the amount of emissions that are generated by the vehicle (not shown). Finally, as previously discussed, the clutching assembly or torque vectoring assemblies 489 and 904 are used to apply an equal and/or variable amount of rotational energy or torque to the wheel assemblies (not shown) of the vehicle (not shown). By varying the amount of rotational energy or torque to the wheels (not shown) of the vehicle (not shown), it allows the vehicle (not shown) to have improved handling and increased grip with the road (not shown) in all driving conditions.

The drive units 400, 600, 800, 900 and/or 1000 additionally allow the vehicle (not shown) to have regenerative breaking and battery charging operating modes. Regenerative breaking is an energy recovery mechanism that is used to slow the vehicle (not shown) down by converting the kinetic energy of the vehicle (not shown) into electrical energy that can be stored for later use. In accordance with this embodiment of the disclosure, the electric motors 402 and 802 operate as a generator to convert the kinetic energy of the vehicle (not shown) into electrical energy. The electrical energy converted by the electric motors 402 and 802 is then transferred to one or more batteries of the vehicle (not shown) to charge the one or more batteries (not shown).

Furthermore, the drive units 400, 600, 800, 900 and/or 1000 allow the vehicle (not shown) to have a disconnected operating mode where the clutching assembly or torque vectoring assemblies 489 and 904 are completely open. According to this embodiment of the disclosure, little to no force is applied to the clutching assembly or torque vectoring assemblies 489 and 904. As a result, the first plurality of clutch plates 514 and 928 are not frictionally engaged with the second plurality of plates 522 and the third plurality of clutch plates 566 and 932 are not frictionally engaged with the fourth plurality of clutch plates 574 of the clutching assembly or torque vectoring assemblies 489 and 904. This allows the vehicle (not shown) to experience an overall increase in fuel efficiency by reducing the amount of spin loss experience by the vehicle (not shown) and provides an overall limit for the maximum speed, rotational power or torque that can be applied to the drive units 400, 600, 800, 900 and/or 1000 by the electric motors 402 and 802.

It is within the scope of this disclosure that the various embodiments of the disclosure described and illustrated herein may be combined with one another to make a drive unit according to an embodiment of the disclosure.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A drive unit assembly, comprising:
   a motor having a motor output shaft;
   a planetary gear input shaft having a first end portion and a second end portion;
      wherein at least a portion of said first end portion of said planetary gear input shaft is drivingly connected to an end of said motor output shaft opposite said motor;
      wherein a sun gear of a planetary gear assembly is connected to at least a portion of said second end portion of said planetary gear input shaft;
      wherein one or more planetary gears are drivingly connected with at least a portion of said sun gear and at least a portion of a planetary gear housing;
   said planetary gear housing having an inner surface, an outer surface, a first end portion and a second end portion;
      wherein said inner surface and said outer surface of said planetary gear housing defines a hollow portion therein;
      wherein said sun gear and at least a portion of said one or more planetary gears are disposed within said hollow portion of said planetary gear housing;
   a planetary gear assembly pinion gear having an inner surface, an outer surface a first side and a second side;
      wherein at least a portion of said first end portion of said planetary gear housing is connected to at least a portion of said planetary gear assembly pinion gear;
   a ring gear having an outer surface, a first side and a second side;
      wherein at least a portion of said planetary gear assembly pinion gear is drivingly connected to at least a portion of said ring gear;
   a first clutch drum having an inner surface, an outer surface, a first end portion and a second end portion;
      wherein at least a portion of said second end portion of said first clutch drum is connected to at least a portion of said first side of said ring gear;
      wherein at least a portion of a first plurality of clutch plates are connected to at least a portion of said inner surface of said first clutch drum;
   a first clutch can having an inner surface and an outer surface;
      wherein at least a portion of a second plurality of clutch plates are connected to at least a portion of said outer surface of said first clutch can;
      wherein said first second plurality of clutch plates are interleafed with said second plurality of clutch plates;
      wherein at least a portion of said inner surface of said first clutch can is drivingly connected to at least a portion of a first shaft;
   a second clutch drum having an inner surface, an outer surface, a first end portion and a second end portion;
      wherein at least a portion of said first end portion of said second clutch drum is connected to at least a portion of said second side of said ring gear;
      wherein at least a portion of a third plurality of clutch plates are connected to at least a portion of said inner surface of said second clutch drum;
   a second clutch can having an inner surface and an outer surface;
      wherein at least a portion of a fourth plurality of clutch plates are connected to at least a portion of said outer surface of said second clutch can;
      wherein said third second plurality of clutch plates are interleafed with said fourth plurality of clutch plates; and
      wherein at least a portion of said inner surface of said second clutch can is drivingly connected to at least a portion of a second shaft.

2. The drive unit assembly of claim 1, further comprising a connecting portion having an inner surface and an outer surface defining a hollow portion therein;
   wherein said connecting portion selectively engages and disengages said motor output shaft with said planetary gear input shaft.

3. The drive unit of claim 1, further comprising one or more first thrust pins and one or more second thrust pins;
   wherein said one or more first thrust pins have a first end portion and a second end portion;
   wherein at least a portion of said one or more first thrust pins extend through one or more first thrust pin openings extending from said inner surface to said outer surface of a radially extending wall of said first clutch drum;
   wherein said one or more second thrust pins have a first end portion and a second end portion; and
   wherein at least a portion of said one or more second thrust pins extend through one or more second thrust pin openings extending from said inner surface to said outer surface of a radially extending wall of said second clutch drum.

4. The drive unit of claim 1, further comprising a first clutch actuation mechanism, a first thrust bearing, a second clutch actuation mechanism and a second thrust bearing;
   wherein said first clutch actuation mechanism applies an amount of force onto an end of said first thrust bearing opposite said one or more first thrust pins translating said one or more first thrust pins axially toward said first and second plurality of clutch plates to apply an amount of force onto said first and/or said second plurality of clutch plates; and wherein said second clutch actuation mechanism applies an amount of force onto an end of said second thrust bearing opposite said one or more second thrust pins translating said one or more second thrust pins axially toward said third and fourth plurality of clutch plates to apply an amount of force onto said third and/or fourth second plurality of clutch plates.

5. The drive unit assembly of claim 4, wherein said first clutch actuation mechanism and/or said second clutch actuation mechanism is a ball and ramp assembly and/or an actuator.

6. The drive unit assembly of claim 1, wherein said one or more planetary gears of said planetary gear assembly are meshingly engaged with a plurality of gear teeth extending from an inner surface of a housing of said drive unit.

7. The drive unit assembly of claim 1, wherein at least a portion of said ring gear separates said first and second plurality of clutch plates from said third and fourth plurality of clutch plates;

wherein at least a portion of said first side and/or said second side of said ring gear is a reaction member for said first, second, third, and/or fourth plurality of clutch plates.

8. A drive unit assembly, comprising:
a motor having a motor output shaft;
a planetary gear input shaft having a first end portion and a second end portion;
wherein at least a portion of said first end portion of said planetary gear input shaft is drivingly connected to an end of said motor output shaft opposite said motor;
wherein a sun gear of a planetary gear assembly is connected to at least a portion of said second end portion of said planetary gear input shaft;
wherein one or more planetary gears are drivingly connected with at least a portion of said sun gear and at least a portion of a planetary gear housing;
said planetary gear housing having an inner surface, an outer surface, a first end portion and a second end portion;
wherein said inner surface and said outer surface of said planetary gear housing defines a hollow portion therein;
wherein said sun gear and at least a portion of said one or more planetary gears are disposed within said hollow portion of said planetary gear housing;
a planetary gear assembly pinion gear;
wherein at least a portion of said planetary gear housing is connected to at least a portion of said planetary gear assembly pinion gear;
a ring gear having an outer surface, a first side and a second side;
wherein at least a portion of said planetary gear assembly pinion gear is drivingly connected to at least a portion of said ring gear;
a first clutch drum having an inner surface, an outer surface, a first end portion and a second end portion;
wherein at least a portion of said second end portion of said first clutch drum is connected to at least a portion of said first side of said ring gear;
wherein at least a portion of a first plurality of clutch plates are connected to at least a portion of said inner surface of said first clutch drum;
a first clutch can having an inner surface and an outer surface;

wherein at least a portion of a second plurality of clutch plates are connected to at least a portion of said outer surface of said first clutch can;
wherein said first second plurality of clutch plates are interleafed with said second plurality of clutch plates;
a second clutch drum having an inner surface, an outer surface, a first end portion and a second end portion;
wherein at least a portion of said first end portion of said second clutch drum is connected to at least a portion of said second side of said ring gear;
wherein at least a portion of a third plurality of clutch plates are connected to at least a portion of said inner surface of said second clutch drum;
a second clutch can having an inner surface and an outer surface;
wherein at least a portion of a fourth plurality of clutch plates are connected to at least a portion of said outer surface of said second clutch can; and
wherein said third second plurality of clutch plates are interleafed with said fourth plurality of clutch plates.

9. The drive unit assembly of claim 8, further comprising a connecting portion having an inner surface and an outer surface defining a hollow portion therein;
wherein said connecting portion selectively engages and disengages said motor output shaft with said planetary gear input shaft.

10. The drive unit assembly of claim 8, further comprising one or more first thrust pins and one or more second thrust pins;
wherein said one or more first thrust pins have a first end portion and a second end portion;
wherein at least a portion of said one or more first thrust pins extend through one or more first thrust pin openings extending from said inner surface to said outer surface of a radially extending wall of said first clutch drum;
wherein said one or more second thrust pins have a first end portion and a second end portion; and
wherein at least a portion of said one or more second thrust pins extend through one or more second thrust pin openings extending from said inner surface to said outer surface of a radially extending wall of said second clutch drum.

11. The drive unit of claim 8, further comprising a first clutch actuation mechanism, a first thrust bearing, a second clutch actuation mechanism and a second thrust bearing;
wherein said first clutch actuation mechanism applies an amount of force onto an end of said first thrust bearing opposite said one or more first thrust pins translating said one or more first thrust pins axially toward said first and second plurality of clutch plates to apply an amount of force onto said first and/or said second plurality of clutch plates; and
wherein said second clutch actuation mechanism applies an amount of force onto an end of said second thrust bearing opposite said one or more second thrust pins translating said one or more second thrust pins axially toward said third and fourth plurality of clutch plates to apply an amount of force onto said third and/or fourth second plurality of clutch plates.

12. The drive unit assembly of claim 11, wherein said first clutch actuation mechanism and/or said second clutch actuation mechanism is a ball and ramp assembly and/or an actuator.

13. The drive unit assembly of claim 8, wherein said one or more planetary gears of said planetary gear assembly are meshingly engaged with a plurality of gear teeth extending from an inner surface of a housing of said drive unit.

14. The drive unit assembly of claim 8, wherein at least a portion of said ring gear separates said first and said second plurality of clutch plates from said third and said fourth plurality of clutch plates;

wherein at least a portion of said first side and/or said second side of said ring gear is a reaction member for said first, second, third, and/or fourth plurality of clutch plates.

15. The drive unit assembly of claim 8, further comprising a pinion gear input shaft having a first end portion and a second end portion;

wherein at least a portion of said first end portion of said pinion gear input shaft is connected to at least a portion of said second end portion of said planetary gear housing; and wherein at least a portion of said second end portion of said pinion gear input shaft is connected to at least a portion of said planetary gear assembly pinion gear.

16. The drive unit assembly of claim 8, further comprising a planetary gear housing shaft having a first end portion, a second end portion and an outer surface;

wherein at least a portion of said first end portion of said planetary gear housing shaft is connected to at least a portion of said planetary gear housing; and wherein at least a portion of said planetary gear housing shaft is drivingly connected to at least a portion of an inner surface of said planetary gear assembly pinion gear.

17. The drive unit assembly of claim 8, further comprising:

a pinion gear drivingly connected with a differential ring gear;

a differential case having a first end portion, a second end portion, an inner surface and an outer surface;

wherein at least a portion of said first end portion of said differential case is connected to at least a portion of said differential ring gear;

wherein at least a portion of said differential case is drivingly connected to one or more outer planetary gears of said planetary differential assembly;

a planet carrier having a first end portion, a second end portion, an inner surface and an outer surface;

wherein at least a portion of said one or more outer planetary gears are drivingly connected to at least a portion of one or more outer planetary gear shafts connected to at least a portion of said planet carrier;

wherein at least a portion of said first end portion of said planet carrier is drivingly connected to at least a portion of an end of a first shaft; and wherein at least a portion of said second end portion of said planet carrier is drivingly connected to at least a portion of said inner surface of said first clutch can;

wherein at least a portion of one or more inner planetary gears are drivingly connected to at least a portion of a sun gear, at least a portion of said one or more outer planetary gears and at least a portion of one or more inner planetary gear shafts connected to at least a portion of said planet carrier; and wherein at least a portion of said sun gear is drivingly connected to at least a portion of said inner surface of said second clutch can and an end of a second shaft.

18. A drive unit assembly, comprising:

a motor having a motor output shaft;

a synchronizing device controlling a rotational speed of the motor;

a planetary gear input shaft having a first end portion and a second end portion;

wherein at least a portion of said first end portion of said planetary gear input shaft is drivingly connected to an end of said motor output shaft opposite said motor;

wherein a sun gear of a planetary gear assembly is connected to at least a portion of said second end portion of said planetary gear input shaft via a connecting portion that selectively engages and disengages the electric motor;

wherein one or more planetary gears are drivingly connected with at least a portion of said sun gear and at least a portion of a planetary gear housing;

said planetary gear housing having an inner surface, an outer surface, a first end portion and a second end portion;

wherein said inner surface and said outer surface of said planetary gear housing defines a hollow portion therein;

wherein said sun gear and at least a portion of said one or more planetary gears are disposed within said hollow portion of said planetary gear housing;

a planetary gear assembly pinion gear having an inner surface, an outer surface a first side and a second side;

wherein at least a portion of said first end portion of said planetary gear housing is connected to at least a portion of said planetary gear assembly pinion gear;

a ring gear having an outer surface, a first side and a second side; and wherein at least a portion of said planetary gear assembly pinion gear is drivingly connected to at least a portion of said ring gear.

* * * * *